(12) United States Patent
Galano

(10) Patent No.: US 10,928,409 B2
(45) Date of Patent: Feb. 23, 2021

(54) SAMPLE RECEIVING ASSEMBLY AND PROBE

(71) Applicant: Siemens Healthcare Diagnostics Inc., Tarrytown, NY (US)

(72) Inventor: Kenneth P. Galano, Wrentham, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 16/468,545

(22) PCT Filed: Dec. 12, 2017

(86) PCT No.: PCT/US2017/065732
§ 371 (c)(1),
(2) Date: Jun. 11, 2019

(87) PCT Pub. No.: WO2018/111825
PCT Pub. Date: Jun. 21, 2018

(65) Prior Publication Data
US 2020/0072861 A1 Mar. 5, 2020

Related U.S. Application Data

(60) Provisional application No. 62/433,486, filed on Dec. 13, 2016.

(51) Int. Cl.
*G01N 35/10* (2006.01)
*G01N 35/04* (2006.01)
*G01N 27/447* (2006.01)

(52) U.S. Cl.
CPC ... *G01N 35/1011* (2013.01); *G01N 27/44743* (2013.01); *G01N 35/04* (2013.01);
(Continued)

(58) Field of Classification Search
None
See application file for complete search history.

(56) References Cited

U.S. PATENT DOCUMENTS

| 4,338,280 A | 7/1982 | Ambers et al. |
| 4,499,053 A * | 2/1985 | Jones ................. G01N 35/1095 422/50 |

(Continued)

FOREIGN PATENT DOCUMENTS

| EP | 0097019 A1 | 12/1983 |
| JP | 2002022701 A | 1/2002 |

(Continued)

OTHER PUBLICATIONS

International Search Report and Written Opinion of International Application No. PCT/US2017/065732 dated Apr. 23, 2018.

(Continued)

*Primary Examiner* — Kathryn Wright
(74) *Attorney, Agent, or Firm* — Dunlap Codding P.C.

(57) ABSTRACT

A sample receiving assembly capable of receiving a fluid sample from sample containers having different sizes and shapes includes an arm, an arm holder, a sample probe, and a support member, the support member having a bore therethrough and a plurality of linear grooves. The arm is disposed within the arm holder and the sample probe is disposed within the arm. The arm holder includes a hollow pivot pin insertable through the bore in the support member. The sample probe has a first portion extendable through a distal end of the arm, and a second portion extending axially through the hollow pivot pin. The plurality of linear grooves in the support member are sized and positioned to receive a guide pin on the arm and guide retraction of the arm into the arm holder from an extended position to a retracted position.

17 Claims, 20 Drawing Sheets

(52) U.S. Cl.
CPC . *G01N 35/1002* (2013.01); *G01N 2035/0443* (2013.01); *G01N 2035/0486* (2013.01); *G01N 2035/0493* (2013.01)

(56) References Cited

U.S. PATENT DOCUMENTS

| | | |
|---|---|---|
| 5,356,525 A | 10/1994 | Goodale et al. |
| 2002/0166394 A1 | 11/2002 | Mathur et al. |
| 2007/0095159 A1 | 5/2007 | Champseix et al. |
| 2008/0287826 A1 | 11/2008 | Videbaek et al. |
| 2012/0196374 A1 | 8/2012 | Haga |
| 2017/0065970 A1* | 3/2017 | Nauschnegg ...... G01N 35/1079 |

FOREIGN PATENT DOCUMENTS

| | | |
|---|---|---|
| JP | 2009053010 A | 3/2009 |
| JP | 2011080964 A | 4/2011 |

OTHER PUBLICATIONS

European Search Report and Search Opinion of European Application No. 17881339.0 dated Nov. 20, 2019.

\* cited by examiner

SAMPLE RECEIVING ASSEMBLY AND PROBE

CROSS-REFERENCE TO RELATED APPLICATION

This application claims priority to U.S. Provisional Application Ser. No. 62/433,486, filed on Dec. 13, 2016, the entire contents of which being hereby expressly incorporated herein by reference.

BACKGROUND

Sample receiving assemblies are used with fluid testing devices such as blood analyzers for the analysis of whole blood, serum, plasma, or for other measurements of body fluids (e.g., pleural fluid and urine). Some of the fluid testing devices or analyzers are automated but designed for only one kind of sample container. For example, an analyzer may permit sample input by means of a syringe only. Other analyzers require manual manipulation of the sample receiving assembly to accommodate different sample containers.

Microfluidic devices typically include open ports for sample introduction. A fluid sample can be introduced by dispensing the sample from the original collection device, such as a syringe, into the open port on the microfluidic device. If the collection device is a tube, such as a VACUTAINER® tube, it is sometimes necessary to first remove a portion of the fluid to be tested by pipette or syringe, followed by dispensing the sample to the open port on the microfluidic device. The fluid transfer presents exposure risks and often requires the use of multiple consumables, which in turn adds to the exposure risk and increases the amount of chemical or biological hazardous waste. Dispensing samples manually to a fluid testing device is also labor intensive and time consuming.

Therefore, a need exists in the art for sample receiving assemblies for use with fluid testing devices wherein the receiving assemblies can be automated and can receive samples from different types and sizes of sample containers.

SUMMARY OF THE INVENTIVE CONCEPTS

The inventive concepts disclosed and claimed herein generally relate to a sample receiving assembly capable of receiving a fluid sample from sample containers having different sizes and shapes. The sample receiving assembly includes a support member, an arm, an arm holder, and a sample probe. The support member has a bore therethrough and a plurality of linear grooves. The arm is partially disposed within the arm holder and the sample probe is partially disposed within the arm. The arm holder includes a hollow pivot pin insertable through the bore in the support member. The sample probe has a first portion extendable through a distal end of the arm, and a second portion extending axially through the hollow pivot pin. The plurality of linear grooves in the support member are sized and positioned to receive a guide pin on the arm and guide retraction of the arm into the arm holder from an extended position to a retracted position.

BRIEF DESCRIPTION OF THE DRAWINGS

To assist those of ordinary skill in the relevant art in making and using the inventive concepts disclosed herein, reference is made to the appended drawings and schematics, which are not intended to be drawn to scale, and in which like reference numerals are intended to refer to the same or similar elements for consistency. For purposes of clarity, not every component may be labeled in every drawing. Certain features and certain views of the figures may be shown exaggerated and not to scale or in schematic in the interest of clarity and conciseness. In the drawings.

DETAILED DESCRIPTION OF EXEMPLARY EMBODIMENTS

Figure 1:
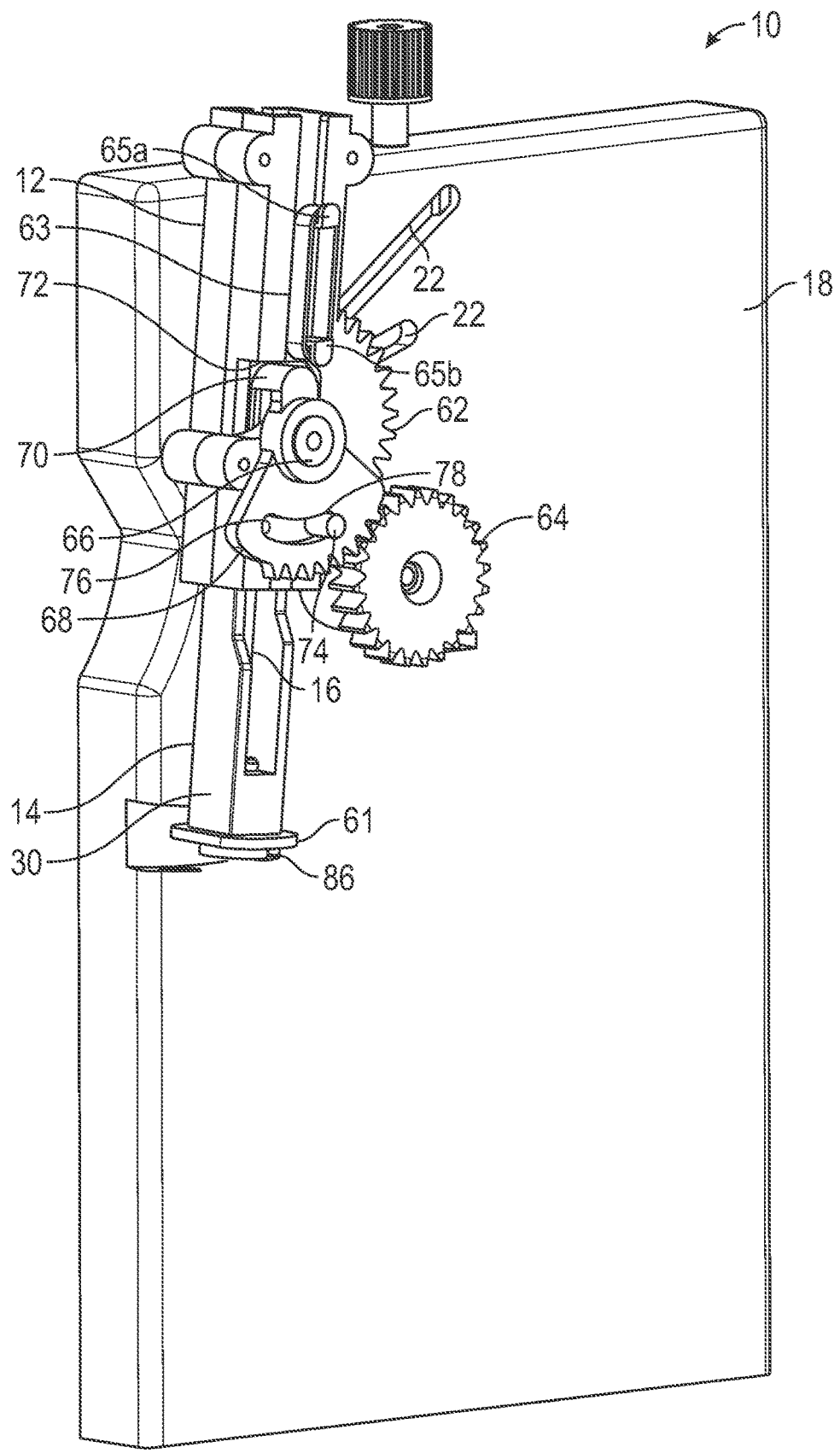
FIG. 1 is a front perspective view of an exemplary embodiment of a sample receiving assembly according to the inventive concepts disclosed herein.

Before explaining at least one embodiment of the inventive concept(s) in detail by way of exemplary drawings, experimentation, results, and laboratory procedures, it is to be understood that the inventive concept(s) is not limited in its application to the details of construction and the arrangement of the components set forth in the following description or illustrated in the drawings, experimentation and/or results. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the presently disclosed and claimed inventive concept(s) shall have the meanings that are commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references that are cited and discussed throughout the present specification. The nomenclatures utilized in connection with, and the laboratory procedures and techniques of, analytical chemistry, synthetic organic chemistry, and medicinal and pharmaceutical chemistry described herein are those well-known and commonly used in the art. Standard techniques are used for chemical syntheses and chemical analyses.

All of the articles, compositions and/or methods disclosed and claimed herein can be made and executed without undue experimentation in light of the present disclosure. While the articles, compositions and methods of the inventive concept(s) have been described in terms of preferred embodiments, it will be apparent to those of skill in the art that variations may be applied to the articles, compositions and/or methods and in the steps or in the sequence of steps of the methods described herein without departing from the concept, spirit and scope of the inventive concept(s). All such similar substitutes and modifications apparent to those skilled in the art are deemed to be within the spirit, scope and concept of the inventive concept(s) as defined by the appended claims.

As utilized in accordance with the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the inherent variation of error for the device, the method being employed to determine the value, or the variation that exists among the study subjects.

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

In the following detailed description of embodiments of the inventive concept, numerous specific details are set forth in order to provide a more thorough understanding of the inventive concept. However, it will be apparent to one of ordinary skill in the art that the inventive concept within the disclosure may be practiced without these specific details. In other instances, well-known features have not been described in detail to avoid unnecessarily complicating the instant disclosure.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
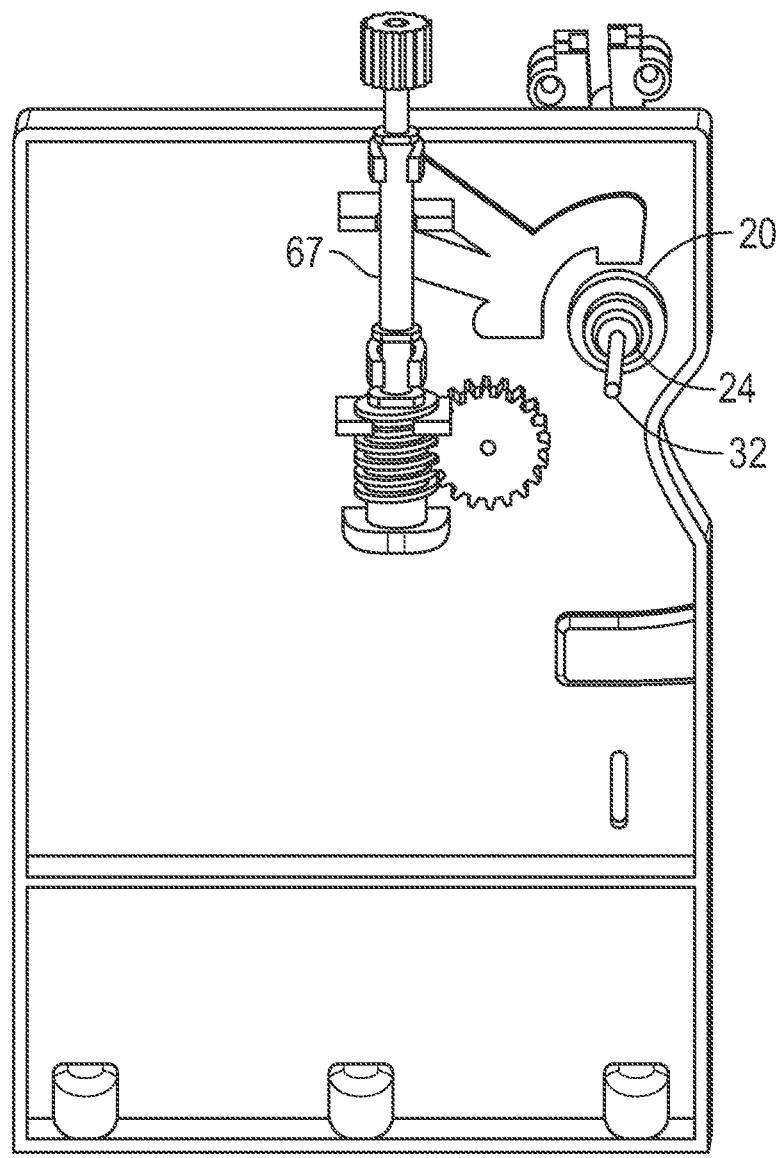
FIG. 2 is a rear perspective view of the sample receiving assembly of FIG. 1.

Referring now to the drawings, and more particularly to FIGS. 1 and 2, shown therein is an exemplary embodiment of a sample receiving assembly 10 constructed in accordance with the inventive concepts disclosed and claimed herein. The sample receiving assembly 10 comprises an arm holder 12, an arm 14 disposed within the arm holder 12 and axially slidable relative thereto, and a sample probe 16 partially disposed within the arm 14. The arm holder 12 is pivotally connected to a support member 18. The arm holder 12, the arm 14, and the sample probe 16 are rotatable to selected positions. The arm 14 is axially movable relative to the arm holder 12 and the sample probe 16 such that the arm 14 is selectively positionable to alter the position of a sample probe distal end 19 relative to the arm 14. The selective positioning of the sample probe distal end 19 allows the sample probe 16 to receive a sample from different types of sample transport containers.

Figure 3:
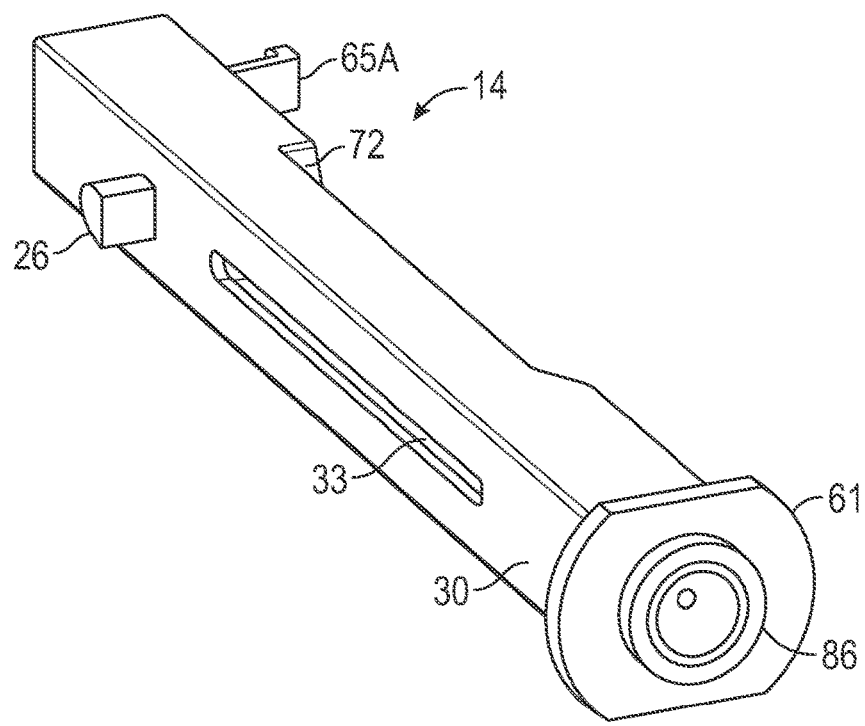
FIG. 3 is a perspective view of an arm of the sample receiving assembly FIG. 1.
Figure 4:
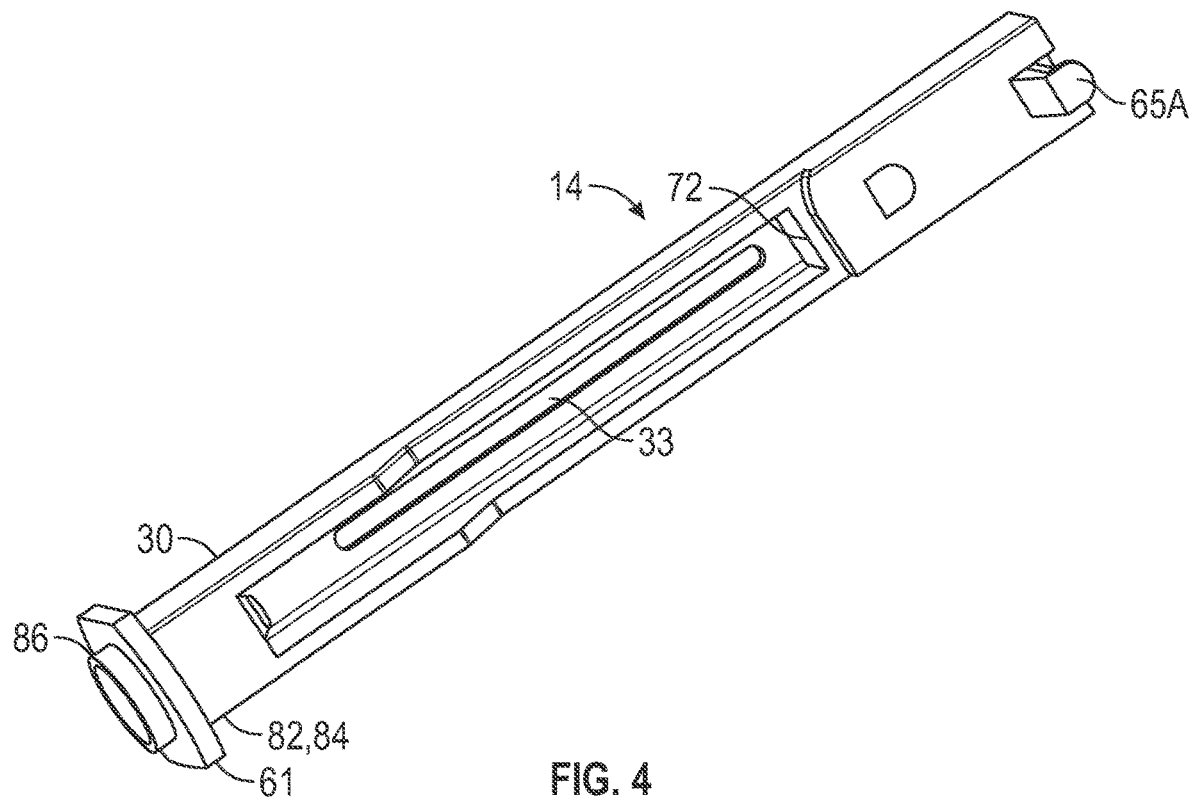
FIG. 4 is a perspective view showing the opposite side of the arm of FIG. 3.
Figure 5A:
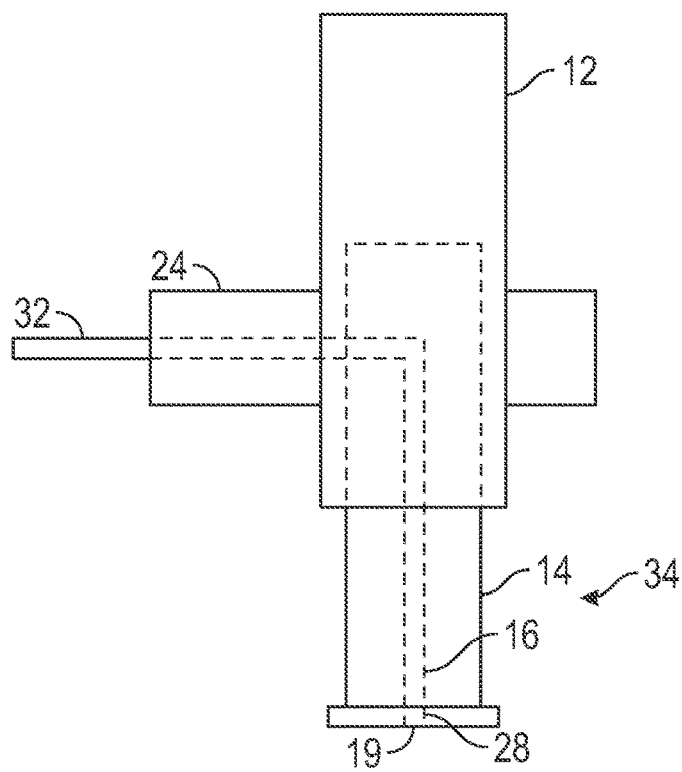
FIG. 5A is an exemplary elevational view of the arm, an arm holder, and a sample probe in a retracted position.
Figure 5B:
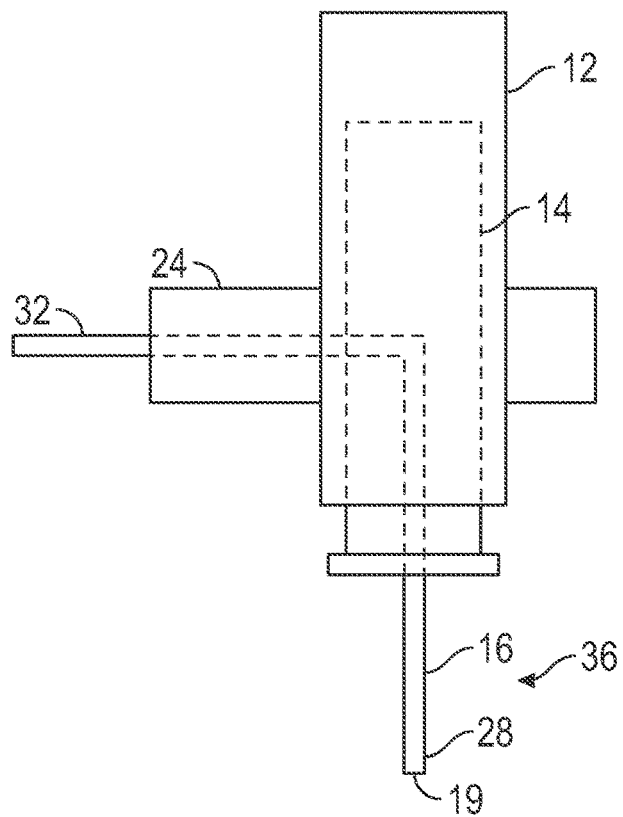
FIG. 5B is an exemplary elevational view of the arm, the arm holder, and the sample probe in an extended position.

In one embodiment, the support member 18 has a bore 20 therethrough and a plurality of linear grooves 22. The arm holder 12 includes a hollow pivot pin 24 insertable through and rotatable within the bore 20. The arm 14, shown in detail in FIGS. 3 and 4, includes a guide pin 26. The sample probe 16 is partially disposed within the arm 14 such that a first portion 28 can extend through the distal end 30 of the arm 14 and a second portion 32 extends axially through the hollow pivot pin 24 to deliver the fluid sample to components of the fluid testing device. An arm slot 33 or the like allows the arm 14 to move while the second portion 32 of the sample probe 16 remains positioned through the hollow pivot pin 24. The linear grooves 22 on the support member 18 are sized to receive the guide pin 26 and are positioned to guide retraction of the arm 14 into the arm holder 12 from an extended position 34 to a retracted position 36, as shown in FIGS. 5A and 5B, respectively.

Figure 6:
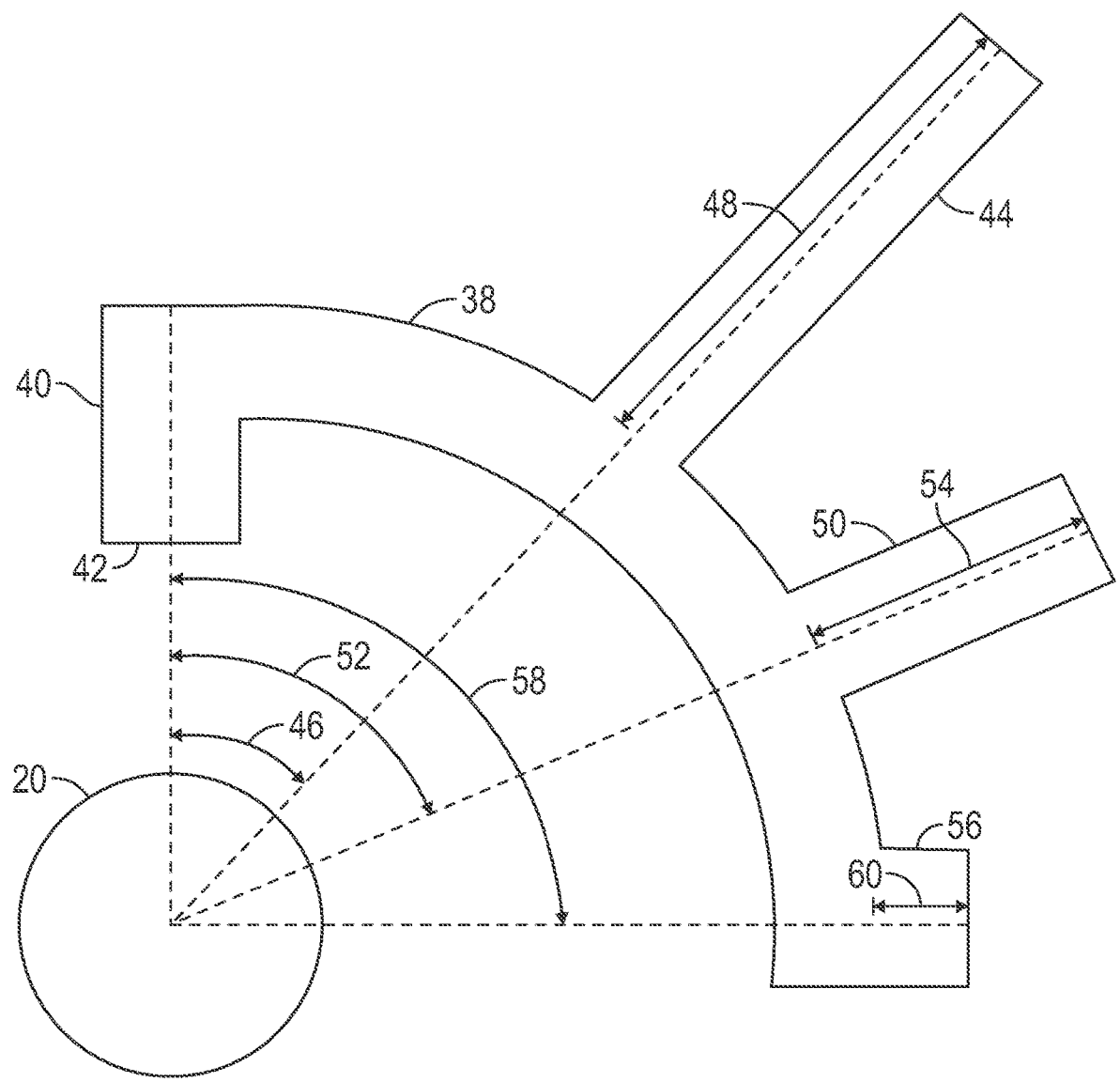
FIG. 6 is a diagram of an exemplary bore and channel configuration.

In one embodiment, as shown in FIG. 6, the support member 28 includes a curved groove 38. The curved groove 38 is sized to receive the guide pin 26 on the arm 14 and is positioned to guide the guide pin 26 to the plurality of linear grooves 22 upon rotation of the arm 14 and arm holder 12. The curved groove 38 follows an arc circling at least a portion of the bore 20. The grooves 22 and 38 can be cut, stamped or molded as an integral part of the support member 18. The grooves 22 and 38 can also be provided separately as tracks and applied to an existing fluid testing device wall using an adhesive or the like.

Figure 7A:
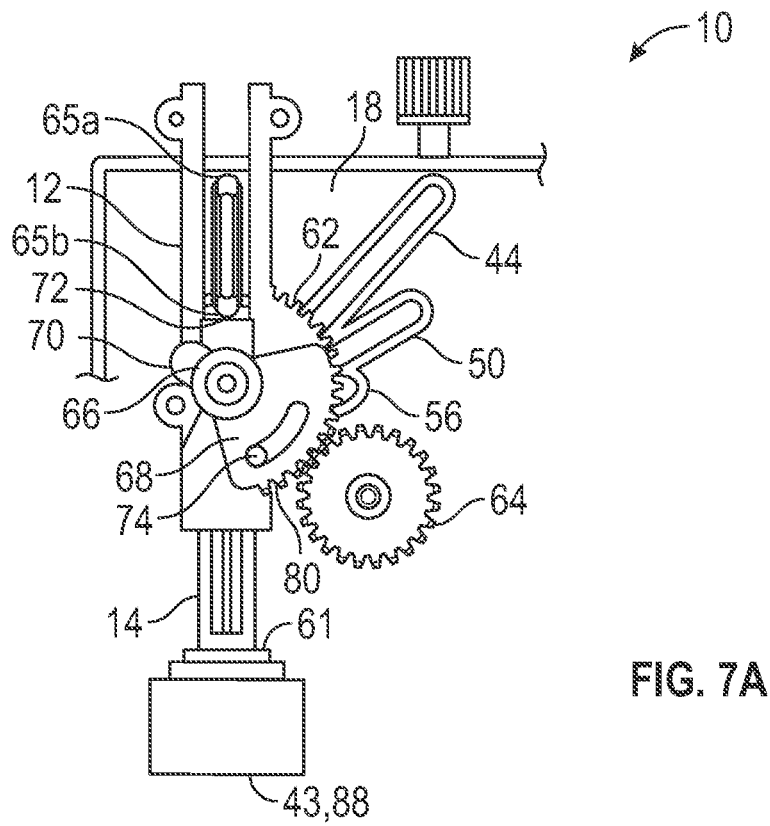
FIG. 7A depicts the sample receiving assembly of FIG. 1 in a sealed position.
Figure 7B:
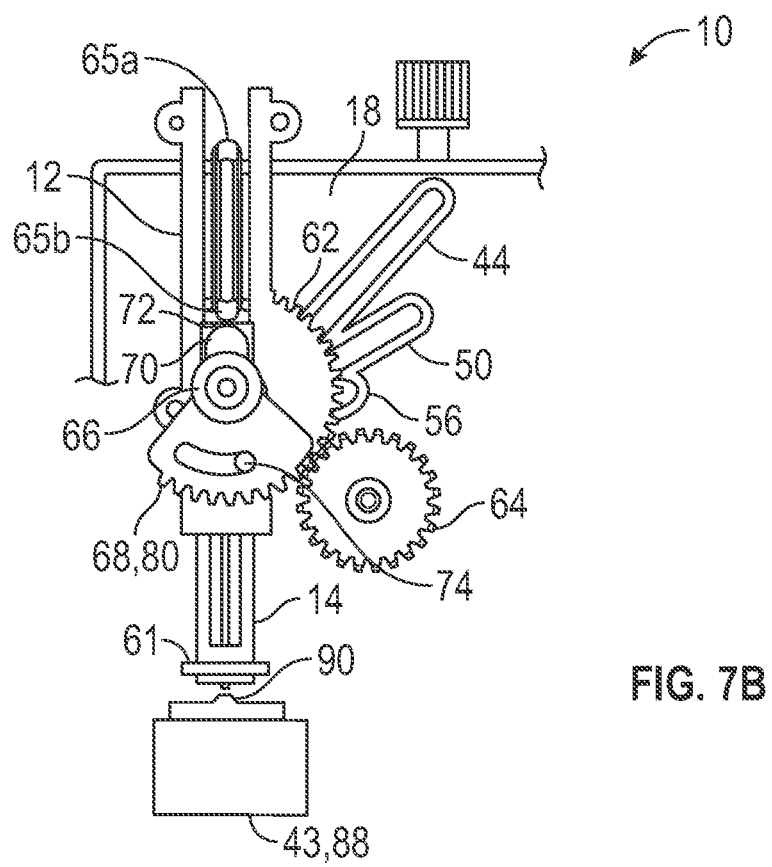
FIG. 7B depicts the sample receiving assembly of FIG. 1 in a raised position.
Figure 7C:
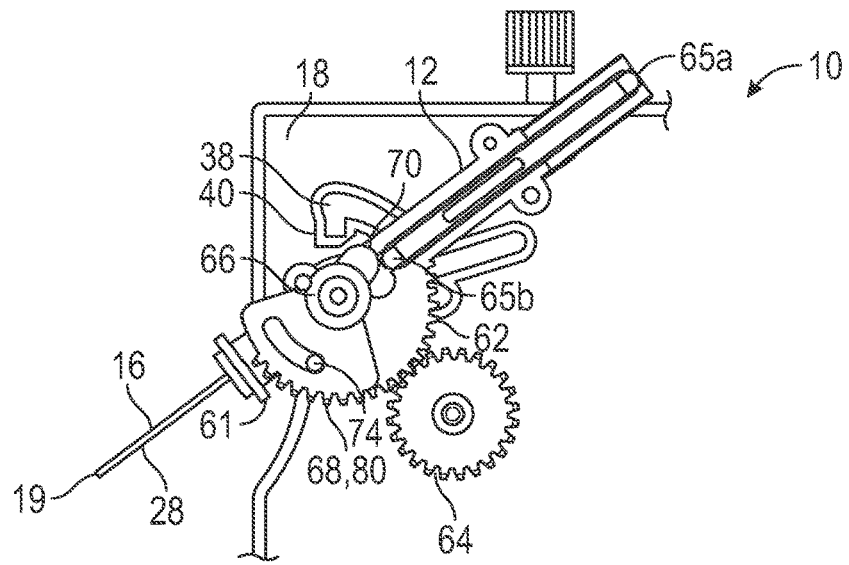
FIG. 7C depicts the sample receiving assembly of FIG. 1 positioned to sample from a VACUTAINER® tube.

In one example, a first linear groove 40 extends vertically from the curved groove 38 toward the bore. The guide pin 26 sits at a distal end 42 of the first linear groove 40 when the sample receiving assembly 10 is in a stand-by mode sealed to a reagent cartridge 43 as shown in FIG. 7A. When the arm 14 is raised through the first linear groove 40, the guide pin 26 is positioned at an intersection between the first linear groove 40 and the curved groove 38. As shown in FIG. 7B, in this raised position the seal between the reagent cartridge 43 and the arm 14 is broken. A second linear groove 44 extends from the curved groove 38 and away from the bore 20 at a first angle 46 from the first linear groove 40. When the arm 14 and arm holder 12 are rotated to align with the second linear groove 44, the arm 14 can be retracted a length 48 of the second linear groove 44. In this example, retraction of the arm 14 causes extension of the sample probe 16, relative to the arm 14, a length compatible with sampling from a closed collection tube such as a VACUTAINER® tube and as shown in FIG. 7C.

Figure 7D:
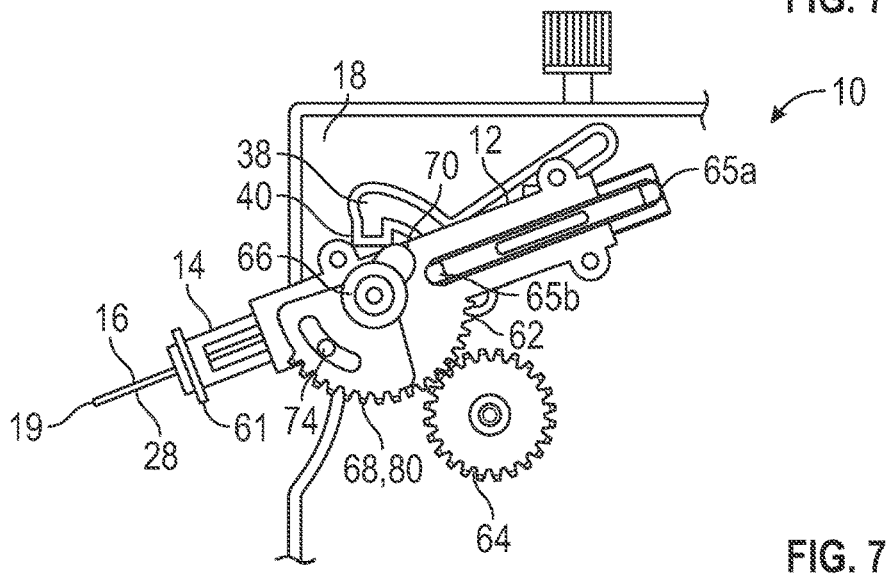
FIG. 7D depicts the sample receiving assembly of FIG. 1 positioned to sample from a syringe.

Similarly, in this example, a third linear groove 50 extends from the curved groove 38 and away from the bore 20 at a second angle 52 from the first linear groove 40. When the arm 14 and arm holder 12 are rotated to align with the third linear groove 50, the arm 14 can be retracted a length 54 of the third linear groove 50. In this case, retraction of the arm 14 causes extension of the sample probe 16, relative to the arm 14, a length compatible with sampling from a syringe as shown in FIG. 7D.

Figure 7E:
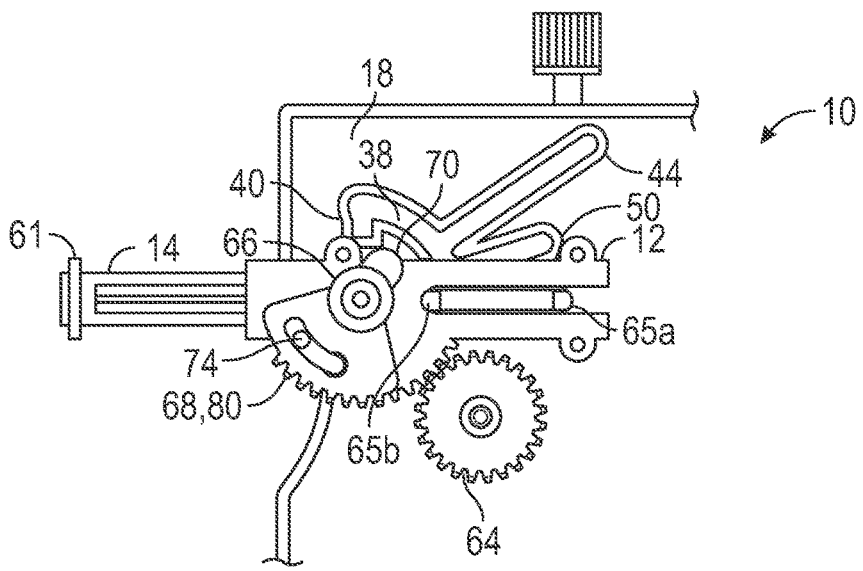
FIG. 7E depicts the sample receiving assembly of FIG. 1 positioned to sample from a capillary tube.

Finally, in this example, a fourth linear groove 56 extends from the curved groove 38 and away from the bore 20 at a third angle 58 from the first linear groove 40. When the arm 14 and arm holder 12 are rotated to align with the fourth linear groove 56, the arm 14 can be retracted a length 60 of the fourth linear groove 56. In this case, retraction of the arm 14 causes extension of the sample probe 16, relative to the arm 14, a length compatible with sampling from a capillary such as a 45 µL capillary tube as shown in FIG. 7E. A capillary connector, such as those known in the art, can be positioned adjacent the distal end 30 of the arm 14.

While the sample receiving assembly 10 has been described as accommodating three different sample transport container types, it is understood that it could accommodate only two sample container types or it could accommodate four or more sample container types. Further, while the sample receiving assembly 10 was described to accept a VACUTAINER® tube, a syringe and a capillary, the sample receiving assembly 10 can be made to accept other container types and sizes.

In one embodiment, the arm holder 12 includes a geared portion 62. A drive gear 64, engageable with the geared portion 62, is used to rotate the arm holder 12 to align with the desired linear groove. Then, by pushing the sample container against the push flange 61 of the arm 14, a technician can cause the arm 14 to retract within the arm holder 12 and the sample probe 16 to extend the appropriate distance into the sample container. A biasing element 63, such as a spring, rubber band, or the like, biases the arm 14 in the extended position 34, such that the arm 14 moves to cover the sample probe 16 when the technician stops pushing forward and removes the sample container from the distal end 30 of the arm 14. In this way the technician is not in danger of contacting the tip of the sample probe 16 or the fluid within the sample container. For example, the biasing element 63 can attach connection point 65a on the arm 14 to connection point 65b on the arm holder 12.

As understood by those skilled in the art, operation of the drive gear 64 can be automated such that the technician selects the sample container type and the sample receiving assembly 10 automatically rotates to the appropriate linear groove. Inclusion of a positioning sensor and a motor (not shown) facilitates the automation. For example, the motor can be connected to a drive shaft 67, which can directly, or indirectly, drive the drive gear 64. Types and designs of motors and positioning sensors can vary and are well known to those skilled in the art.

Figure 8:
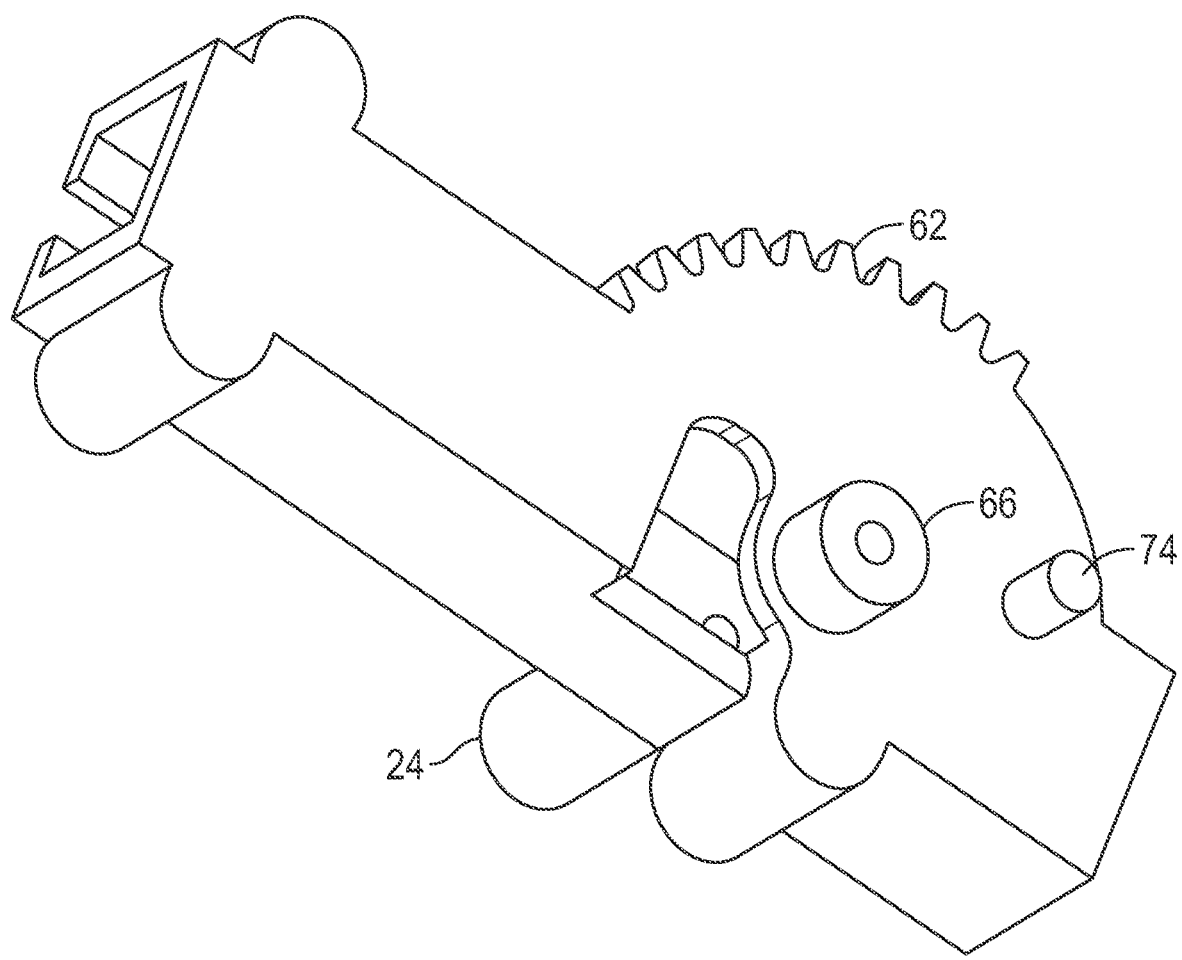
FIG. 8 is a perspective view of the arm holder of the sample receiving assembly of FIG. 1.
Figure 9:
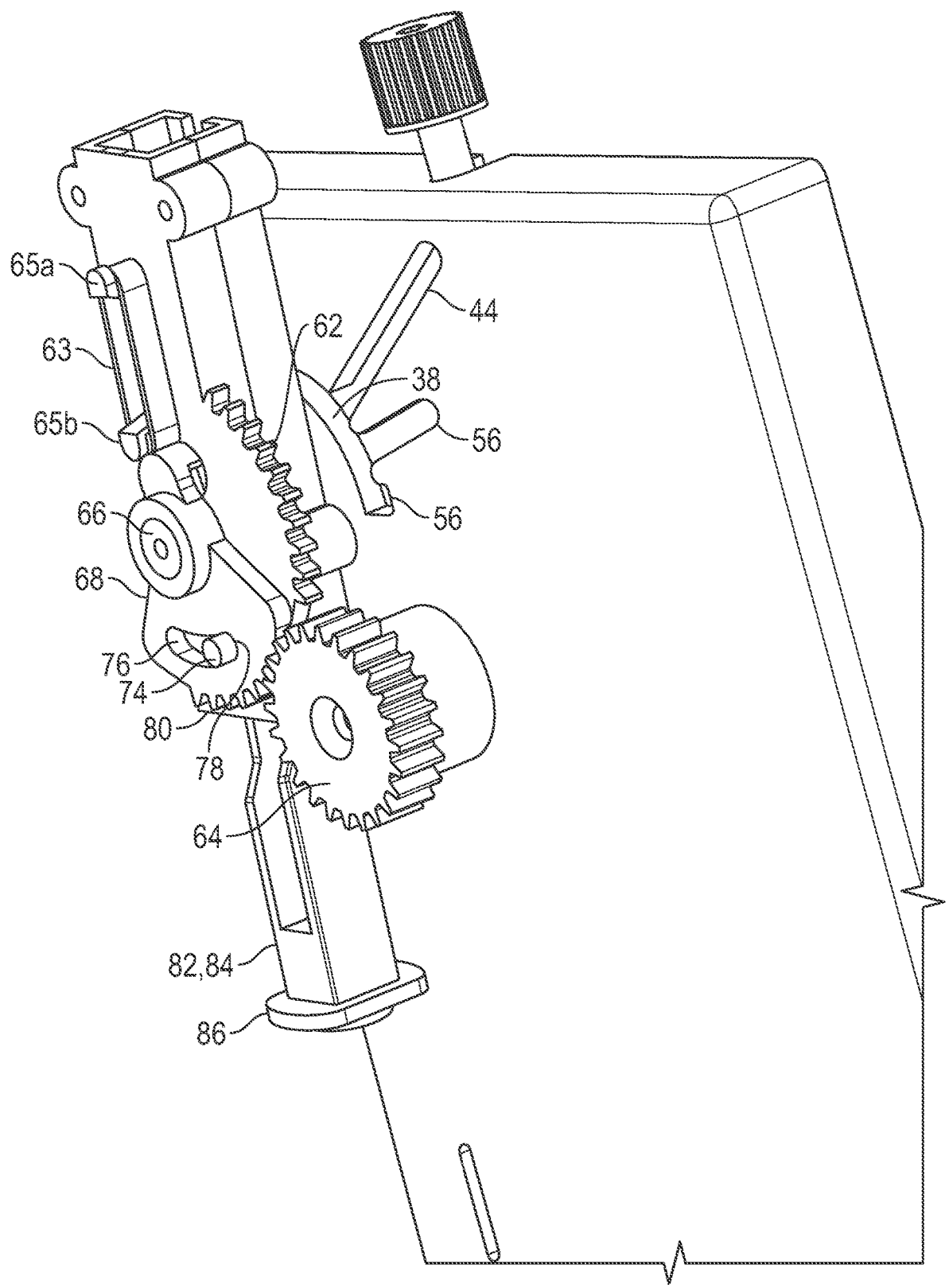
FIG. 9 is another perspective view of the sample receiving assembly of FIG. 1.
Figure 10:
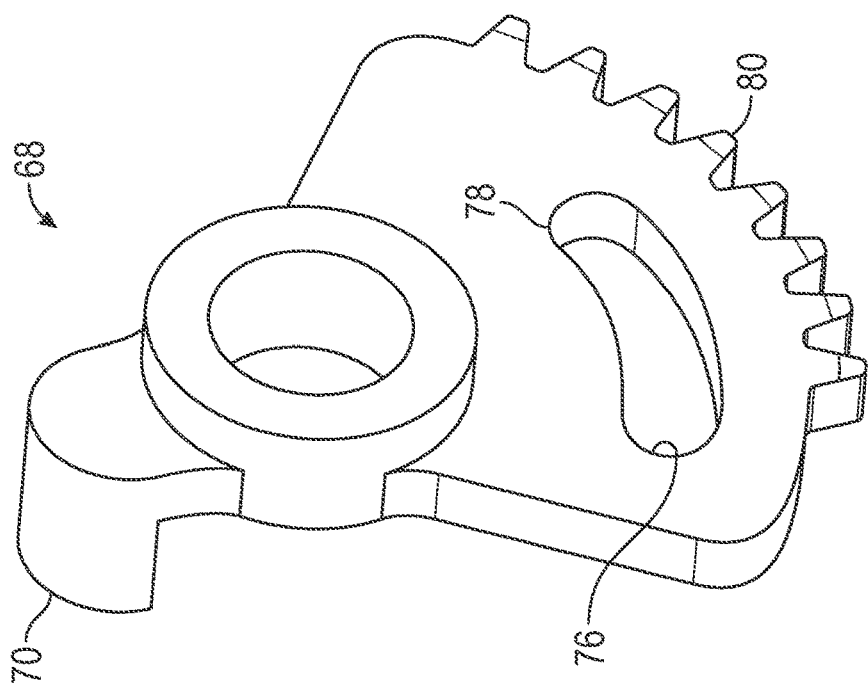
FIG. 10 is a perspective view of an exemplary lift cam.

In one embodiment, and as shown in FIGS. 8-10, the arm holder 12 includes a pivot stud 66 axially aligned with and opposing the hollow pivot pin 24. A lift cam 68 is rotatable about the pivot stud 66 and includes a lift extension 70 contacting a lift surface 72 of the arm 14 (see FIGS. 3-4) so as to raise or lower the arm 14 with rotation of the lift cam 68 by the drive gear 64. A stop pin 74 can extend through a slot 76 in the lift cam 68. The stop pin 74 and the slot 76 are aligned such that rotation of the lift cam 68 in a first direction causes the stop pin 74 to abut a first end 78 of the slot 76 after lifting the arm 14 to a raised position. In the raised position, the guide pin 26 is now within the curved groove 38 and the arm 14 and arm holder 12 are capable or rotating. Further rotation of the lift cam 68 in the first direction causes rotation of the arm holder 12. The lift cam geared portion 80 does not overlap with the geared portion 62 of the arm holder 12; however, once the aforementioned rotation initiates, the drive gear 64 contacts the geared portion 62 of the arm holder 12 and continues rotation of the arm holder 12 to the desired position.

Referring to FIG. 9, at least one of a capillary connector 82, a probe wipe 84, and a system seal 86 can be positioned adjacent the distal end 30 of the arm 14. Capillary connectors are known to those in the art. Probe wipes are also known and can help to minimize contamination of the fluid sample removed as well as that remaining in the sample transport container during the sampling procedure. The system seal 86 maintains the integrity of the sample receiving assembly as well as the attached analytical device.

In one embodiment, a reagent card 88 is adjacent the support member 18. The reagent card 88 is located to engage the system seal 86 adjacent the distal end 30 of the arm 14 when the arm 14 is in a standby position. The reagent card 88 can include a nipple 90 positioned and sized such that the system seal 86 sits on the nipple 90 when the arm 14 is in the standby position. Rotation of the lift cam 68 raises the arm 14 and the system seal 86 off of the nipple 90.

Figure 11:
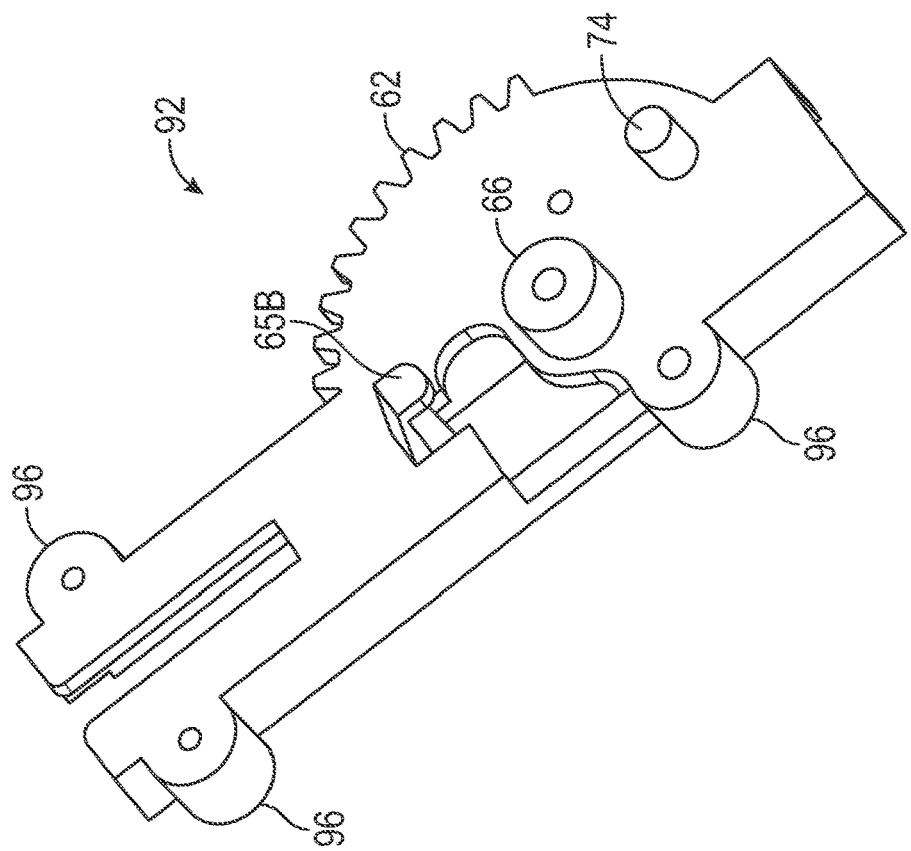
FIG. 11 is a perspective view of a front arm holder section of an exemplary arm holder.
Figure 12:
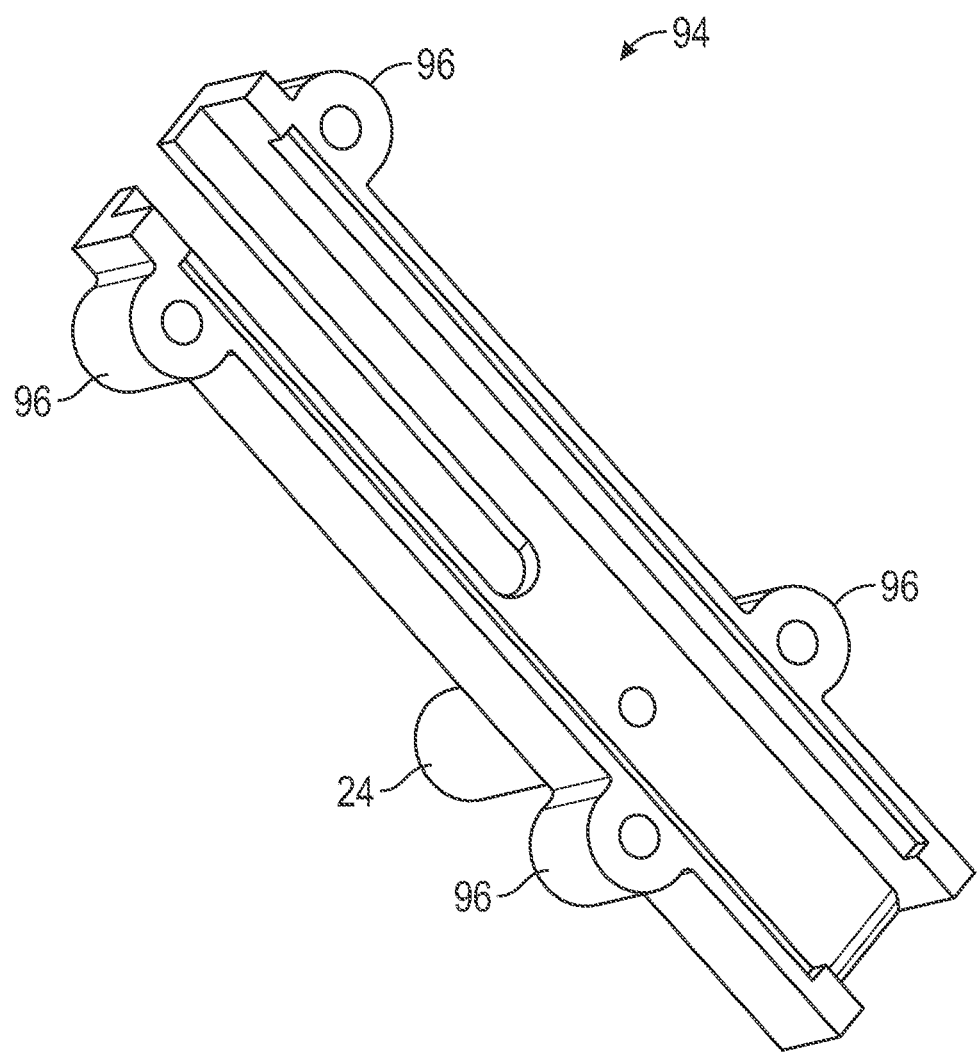
FIG. 12 is a perspective view of a rear arm holder section to be attached to the front arm holder section of FIG. 11.

In one embodiment, and as shown in FIGS. 11 and 12, the arm holder 12 is constructed from two sections, a front arm holder section 92 and a rear arm holder section 94. This facilitates placement of the arm 14 and the sample probe 16. Once the arm 14 and the sample probe 16 are placed within one of the front and rear arm holder sections 92 and 94, respectively, the two sections can be attached using screws or the like at connection areas 96. The connection areas can be reinforced.

In some instances, it may be desirable to have or distribute a sample receiver. For example, the sample receiving assembly can be designed with a disposable sample receiver. Such a sample receiver can include the arm holder 12, arm 14, and lift cam 68 as described above. One or more sample probes 16 can be included with the sample receiver. The sample receiver may also include one or more biasing elements 63.

Figure 13:
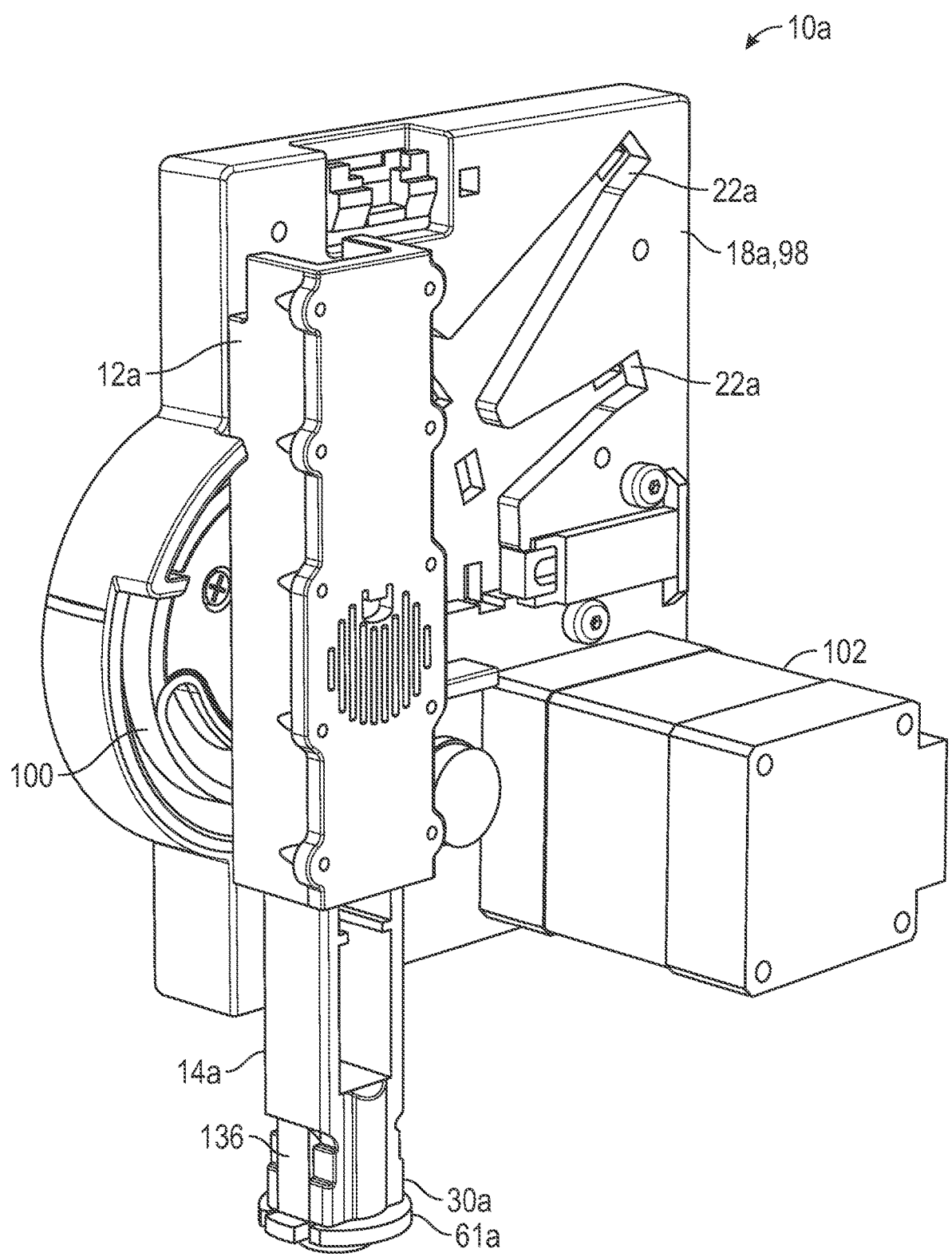
FIG. 13 is a front perspective view of another exemplary embodiment of a sample receiving assembly according to the inventive concepts disclosed herein.
Figure 14:
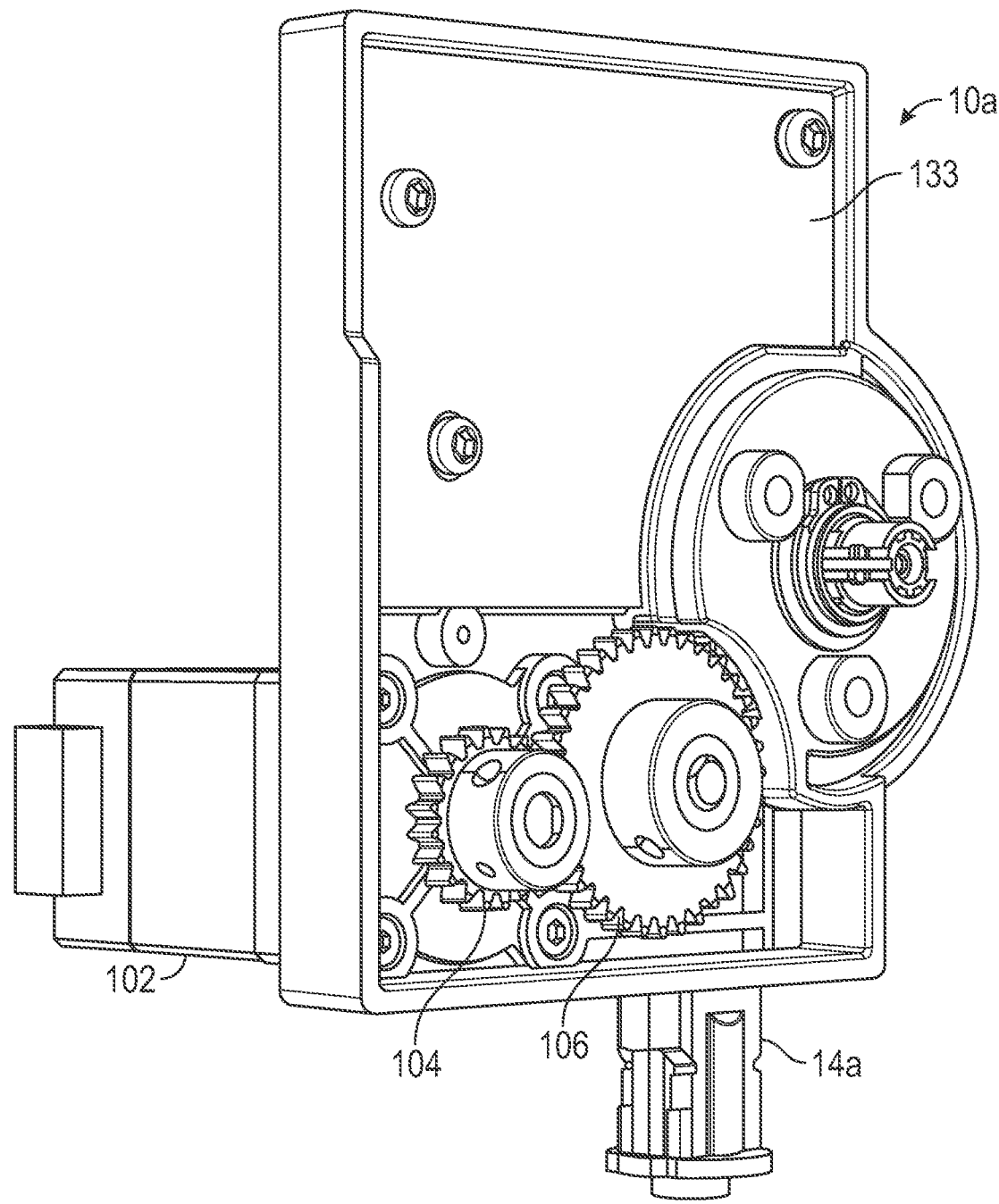
FIG. 14 is a rear perspective view of the sample receiving assembly of FIG. 13.
Figure 15:
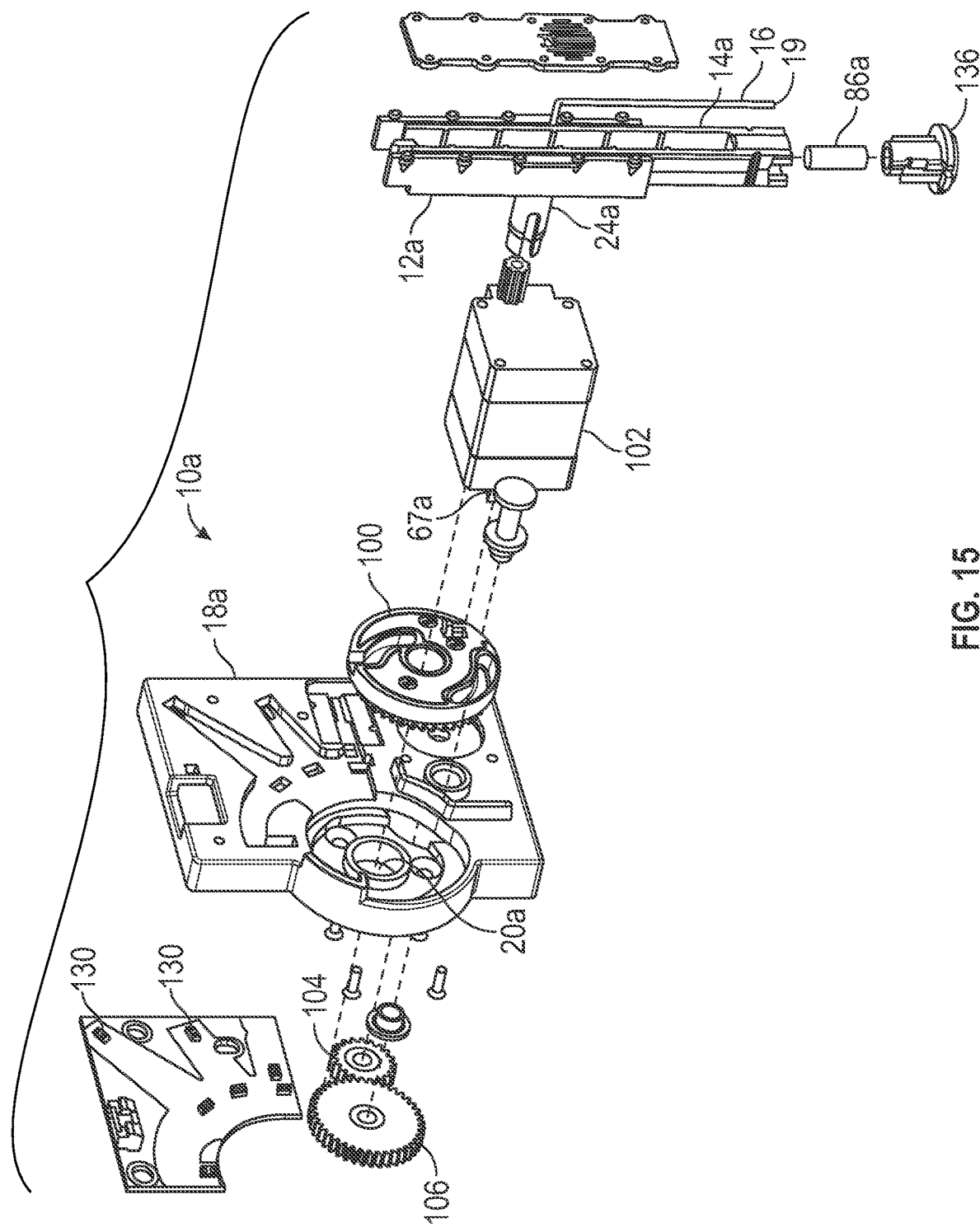
FIG. 15 is an exploded view of the sample receiving assembly of FIG. 13.

Referring now to FIGS. 13-15, shown therein is another exemplary embodiment of a sample receiving assembly 10a constructed in accordance with the inventive concepts disclosed and claimed herein. The sample receiving assembly 10a comprises an arm holder 12a, an arm 14a disposed within the arm holder 12a and axially slidable relative thereto, and the sample probe 16 partially disposed within the arm 14a. The arm holder 12a is pivotally connected to a support member 18a. The arm holder 12a, the arm 14a, and the sample probe 16 are rotatable to selected positions. The arm 14a is axially movable relative to the arm holder 12a and the sample probe 16 such that the arm 14a is selectively positionable to alter the position of a sample probe distal end 19 relative to the arm 14a. The selective positioning of the sample probe distal end 19 allows the sample probe 16 to receive a sample from different types of sample transport containers.

Similar to previously described embodiments, the support member 18a can have a bore 20a therethrough and a plurality of linear grooves 22a. The arm holder 12a can include a hollow pivot pin 24a insertable through and rotatable within the bore 20a. The arm 14a includes a guide pin 26a (see FIG. 17). The sample probe 16 is partially disposed within the arm 14a such that a first portion 28 can extend through the distal end 30a of the arm 14a and a second portion 32 can extend axially through the hollow pivot pin 24a to deliver the fluid sample to components of the fluid testing device. As in FIG. 4 of the previously described embodiments, an arm slot 33 or the like allows the arm 14a to move while the second portion 32 of the sample probe 16 remains positioned through the hollow pivot pin 24a. The linear grooves 22a on the support member 18a are sized to receive the guide pin 26a and are positioned to guide retraction of the arm 14a into the arm holder 12a from an extended position to a retracted position.

In one embodiment, and as previously described in detail, the support member 18a includes a curved groove 38a. The curved groove 38a is sized to receive the guide pin 26a on the arm 14a and is positioned to guide the guide pin 26a to the plurality of linear grooves 22a upon rotation of the arm 14a and arm holder 12a. The curved groove 38a follows an arc circling at least a portion of the bore 20a. The grooves 22a and 38a can be cut, stamped, or molded as an integral part of the support member 18a. The grooves 22a and 38a can also be provided separately as tracks and applied to an existing fluid testing device wall using an adhesive or the like.

Figure 16:
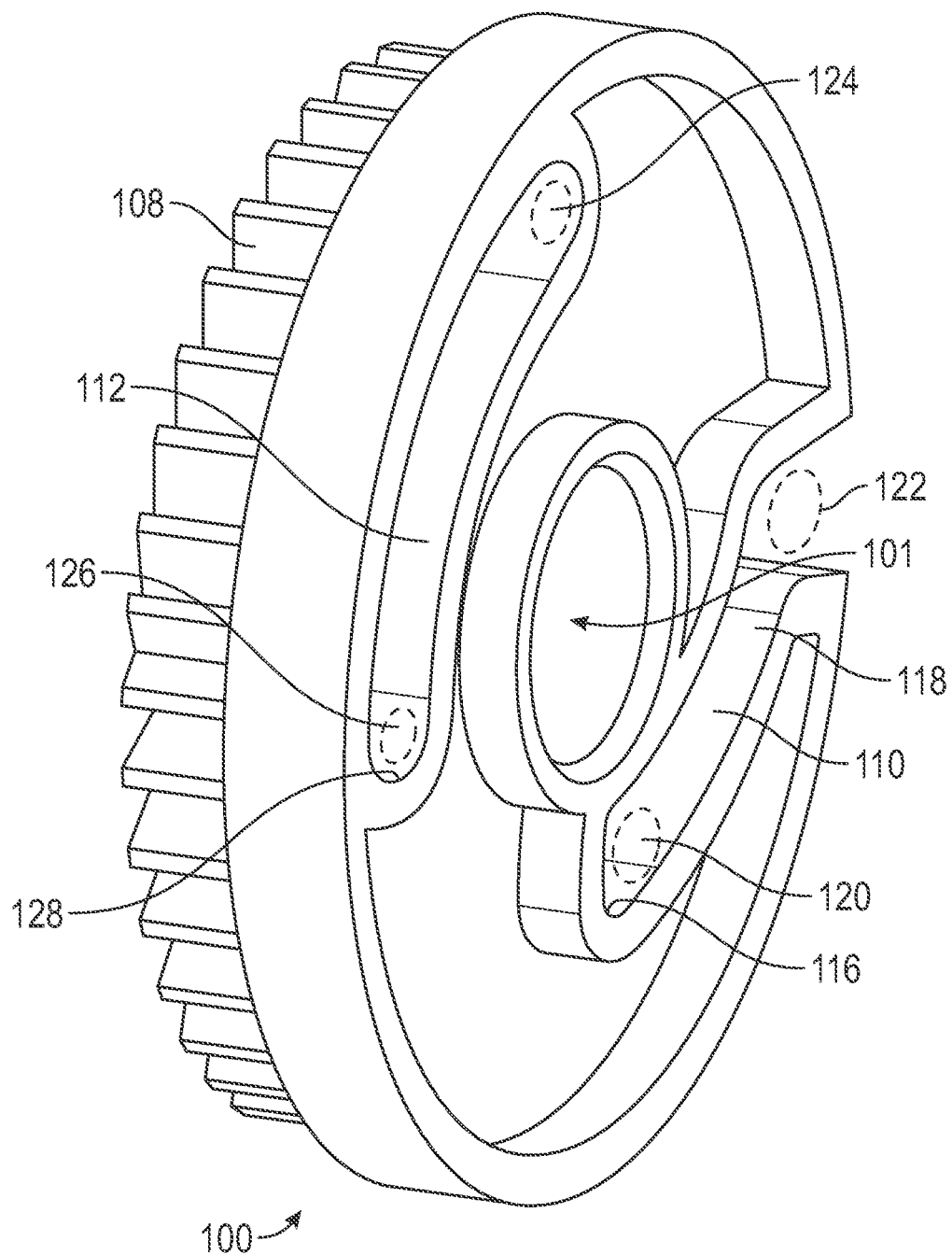
FIG. 16 is a front perspective view of a positioning disc.

The support member 18a can comprise a drive housing 98 supporting a positioning disc 100 (FIG. 16). The positioning disc 100 has a central bore 101 axially aligned with the support member bore 20a to receive the hollow pivot pin 24a and the second portion 32a of the sample probe 16. The positioning disc 100 is used to raise or lower the arm 14a and rotate the arm holder 12a to align with the desired linear groove. For example, a motor 102 connected to a drive shaft 67a can drive the positioning disc 100 directly through a main drive gear 104, or indirectly through a transition drive gear 106.

Figure 17:
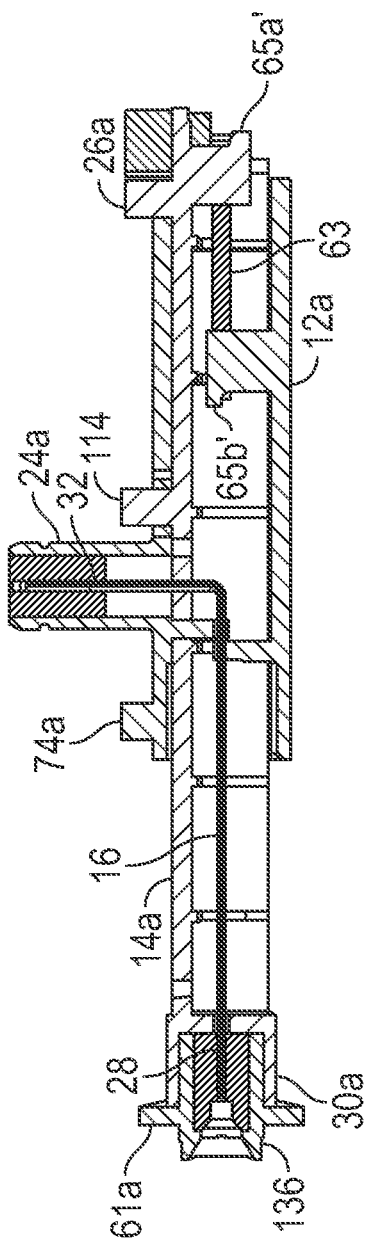
FIG. 17 is a section view of the arm, arm holder, and sample probe of the sample receiving assembly of FIG. 13.

As shown in FIGS. 16 and 17, the positioning disc 100 can include radially inset gear teeth 108 that mesh with, for example, the transition drive gear 106. The positioning disc 100 can include a lift slot 110 and a rotation slot 112. The arm 14a includes a lifting pin 114 that extends into the lift slot 110, and the stop pin 74a in the arm holder 12a extends into the rotation slot 112. The lifting pin 114 rests along an inward surface 116 of the lift slot 110 at an initial position 120 when the arm 14a is in the standby position. Initial rotation of the positioning disc 100 in a first direction (shown as clockwise) raises the lifting pin 114 to an outward surface 118 of the lift slot 110 and a lifted position 122. This raises the arm 14a and the system seal 86a off of the nipple 90a to a raised position.

In one embodiment, the initial rotation of the positioning disc 100 in the first direction also moves the stop pin 74a in the arm holder 12a from a first position 124 to a second position 126 within the rotation slot 112. Once the lifting pin 114 raises the arm 14a, and the stop pin 74a is in the second position 126 abutting a first end 128 of the rotation slot 112, the guide pin 26a is within the curved groove 38a and the arm 14a and arm holder 12a are capable of rotating. Further rotation of the positioning disc 100 causes rotation of the arm holder 12a to the desired position. Then, as previously described, by pushing the sample container against the push flange 61a of the arm 14a, a technician can cause the arm 14a to retract within the arm holder 12a and the sample probe 16 to extend the appropriate distance into the sample container. The biasing element 63 biases the arm 14a in the extended position 34, such that the arm 14a moves to cover the sample probe 16 when the technician stops pushing forward and removes the sample container from the distal end 30a of the arm 14a. In this way the technician is not in danger of contacting the tip of the sample probe 16 or the fluid within the sample container. For example, the biasing element 63 can attach connection point 65a' on the arm 14a to connection point 65b' on the arm holder 12a.

As understood by those skilled in the art, operation of the motor 102 can be automated such that the technician selects the sample container type and the sample receiving assembly 10a automatically rotates to the appropriate linear groove. Inclusion of positioning sensors 130 can facilitate the automation. Types and designs of positioning sensors can vary and are well known to those skilled in the art.

Figure 18B:
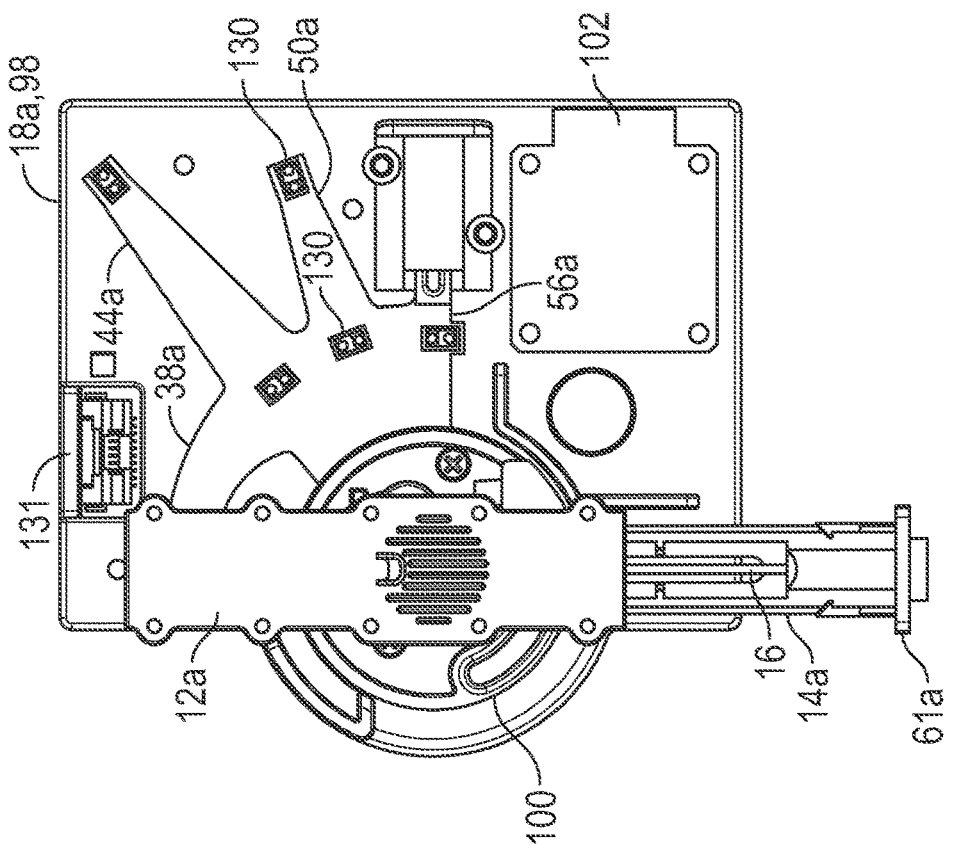
FIG. 18B depicts the sample receiving assembly of FIG. 13 in a lifted position.
Figure 18A:
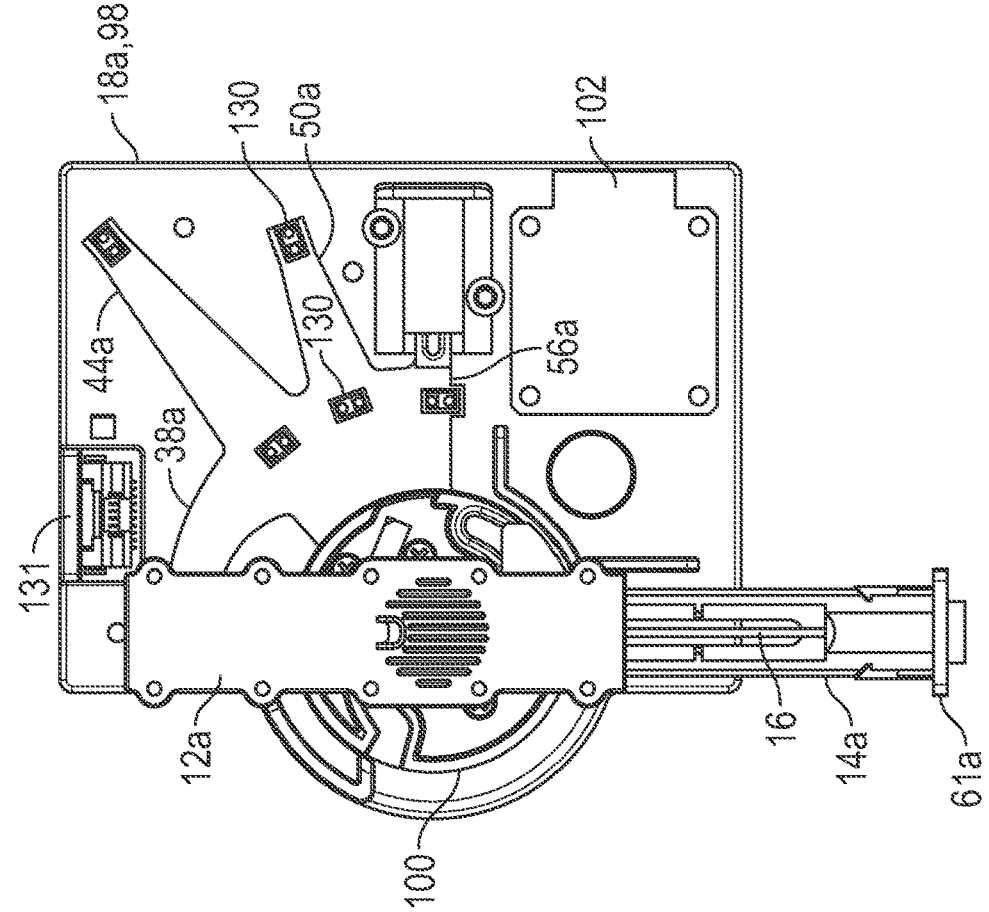
FIG. 18A depicts the sample receiving assembly of FIG. 13 in a standby position.
Figure 18C:
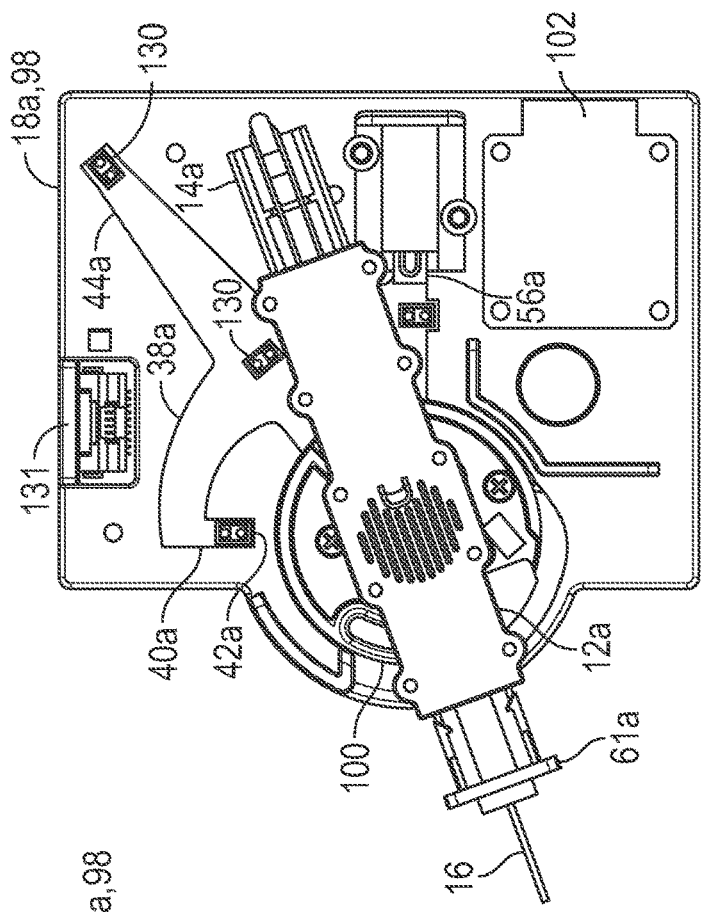
FIG. 18C depicts the sample receiving assembly of FIG. 13 positioned to sample from a VACUTAINER® tube.
Figure 18D:
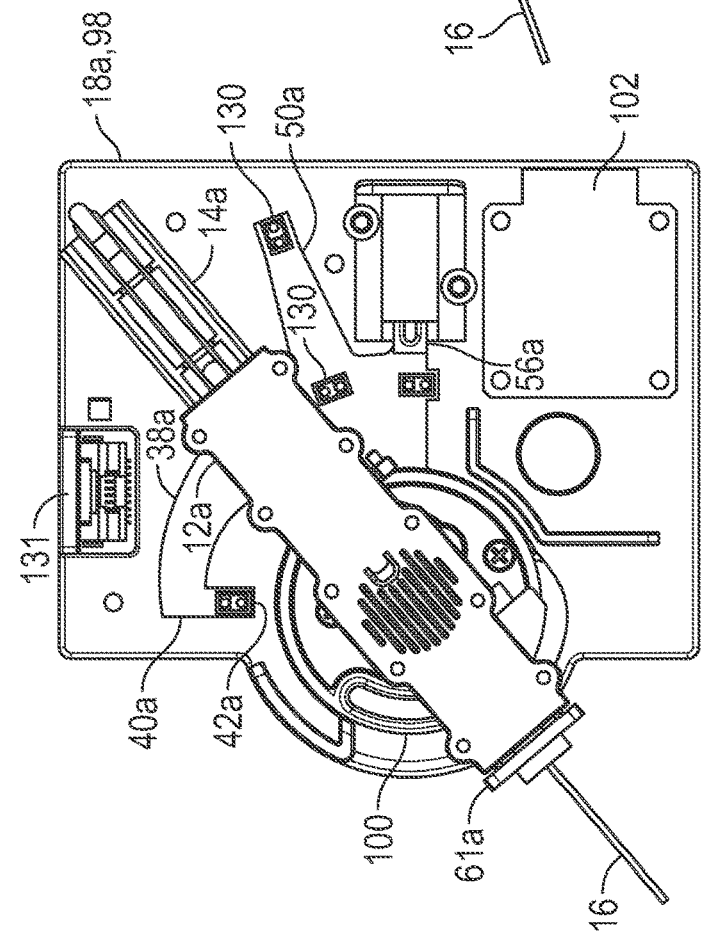
FIG. 18D depicts the sample receiving assembly of FIG. 13 positioned to sample from a syringe.
Figure 18E:
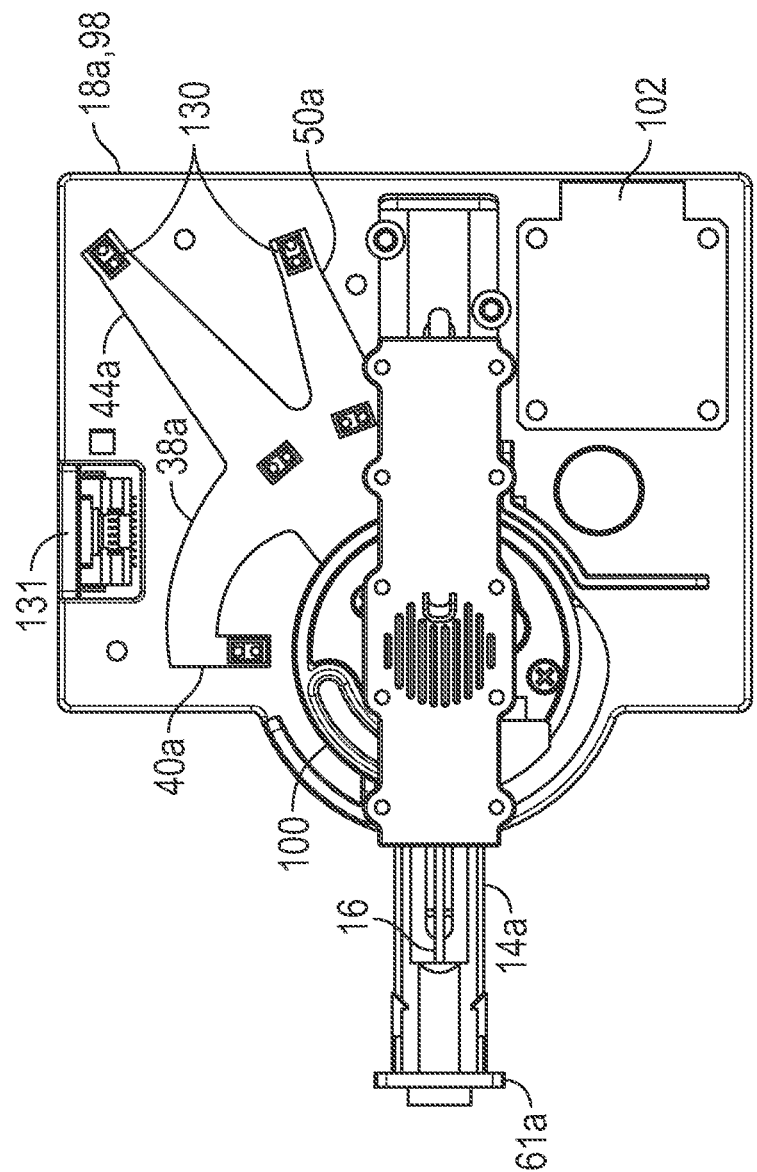
FIG. 18E depicts the sample receiving assembly of FIG. 13 positioned to sample from a capillary tube.

In one example, five automated positions of the sample receiving assembly 10a are available as shown in FIGS. 18A-18E. The guide pin 26a (FIG. 17) sits at a distal end 42a of the first linear groove 40a when the sample receiving assembly 10a is in a stand-by position as shown in FIG. 18A. When the arm 14a is raised through the first linear groove 40a by rotation of the positioning disc 100, the guide pin 26a is positioned at the intersection between the first linear groove 40a and the curved groove 38a in a lifted position as shown in FIG. 18B. Further rotation of the positioning disc 100 causes the arm 14a and the arm holder 12a to rotate and align with the second linear groove 44a. The arm 14a can be retracted as previously explained and, as shown in FIG. 18C, can accept a fluid sample from, for example, a VACUTAINER® container. Similarly, the arm 14a and arm holder 12a can be further rotated by the positioning disc 100 to align with the third linear groove 50a, as shown in FIG. 18D. In this position, retraction of the arm 14a through the third linear groove 50a facilitates receiving a sample from, for example, a syringe. When the arm 14a and the arm holder 12a are yet further rotated by the positioning disc 100 to align with the fourth linear groove 56a, as shown in FIG. 18E, retraction of the arm 14a causes extension of the sample probe 16 relative to the arm 14a a length compatible with sampling from a capillary, such as a 45 µL capillary tube. The positioning sensors 130 can facilitate automation by, for example, communicating the position of the arm 14 through an interface connector 131 to a circuit board 133 on the back of the sample receiving assembly 10a as shown in FIG. 14.

Figure 19:
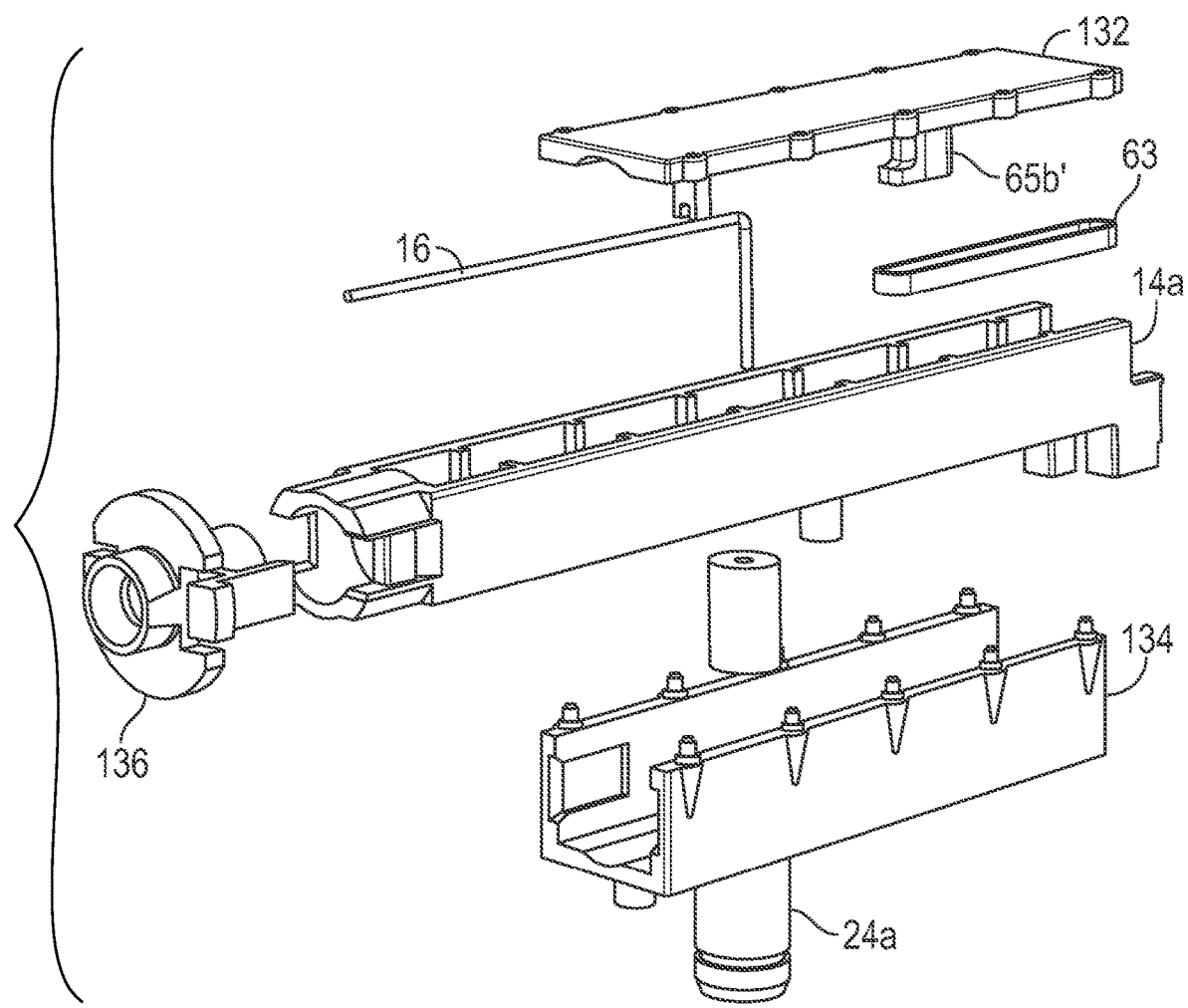
FIG. 19 is an exploded view of the arm, arm holder, and sample probe of the sample receiving assembly of FIG. 13.

In one embodiment, and as shown in FIG. 19, the arm holder 12a can be constructed from two sections, an arm holder cover plate section 132, and an arm holder body 134. The arm 14a and the sample probe 16 are positioned within the arm holder body 134 and cover plate 132, and the two arm holder sections can be attached using screws or the like.

It may be desirable to have disposable components within the sample receiving assembly 10a. In one embodiment, the distal end 30a of the arm 14a supports a sample port 136, which can be readily removed and replaced daily, with each sample, or at the user's discretion. The sample port 136 can include the capillary connector 82a, the probe wipe 84a, and the system seal 86a.

Similarly, the arm holder 12a and arm 14a, with or without the sample port 136, can be removable and can be replaced monthly, at the same time as the reagent cartridge is recycled, or at the user's discretion, thereby reducing service costs.

In one embodiment, the drive housing 98, including the positioning disc, drive gears, and sensor modules, can be replaced annually, semi-annually, or at the user's discretion, which can reduce the user's service costs.

A fluid testing device can include the sample receiving assembly as described above. Nonlimiting examples of suitable fluid testing devices include microfluidic devices, blood gas analyzers, hematology analyzers, urine chemistry analyzer, and the like. The sample receiving assembly can be automated and the automation may be separate or combined with the testing device automation. The shorter sample path of the sample receiving assembly as described above reduces the necessary sample volume and therefore the reagent usage and reagent carryover for the fluid testing device.

In one exemplary embodiment, a fluid testing device includes a chamber containing analytical components and having a support member with a bore therethrough. An arm holder, arm, sample probe, and drive gear and lift cam or positioning disc are as described above. The grooves in the support member or drive housing can be positioned to allow rotation of the arm holder and extension of the sample probe compatible with sampling from at least three different sample container types. For example, the testing device may allow automated sampling selected from a capillary, a syringe, and a closed tube such as a VACUTAINER® tube. A positioning sensor can be located to determine a position of the guide pin or angle of the arm or arm holder, and a motor is included to drive the drive gear. Positioning sensors and suitable motors such as small electric motors are known and understood by those skilled in the art. An input device, such as those known in the art, allows a user to indicate which sample container type is to be used. A processor can be configured to receive a signal from the input device indicative of the selected sample container type, receive second signals from the positioning sensor indicative of the position of the guide pin or angle of the arm or arm holder, and activate the motor for a time sufficient for the guide pin to lift and rotate to a position consistent with the selected sample container type.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

The following is a list of non-limiting illustrative embodiments of the inventive concepts disclosed herein:

1. A sample receiving assembly, comprising:
   a support member having a bore extending therethrough;
   an arm holder pivotally connected to the support member;
   an arm disposed within the arm holder and axially slidable relative thereto, the arm comprising a distal end;
   a sample probe partially disposed within the arm, the sample probe having a first portion extendable through the distal end of the arm and a second portion extending through the bore of the support member; and
   wherein the arm holder, the arm, and the sample probe are rotatable to selected positions and the arm is axially movable relative to the arm holder and the sample probe in a way that the arm is selectively positionable to alter the position of the distal end of the sample probe relative to the arm so that the probe can receive a sample from different types of sample transport containers.

2. The illustrative sample receiving assembly of embodiment 1, wherein the arm holder includes a hollow pivot pin received by the support member bore, and wherein the sample probe second portion extends axially through the hollow pivot pin.

3. The illustrative sample receiving assembly of embodiment 2, further comprising:
   a guide pin disposed on the arm; and
   a plurality of linear grooves formed along the support surface, the plurality of linear grooves sized to receive the guide pin and positioned to guide retraction of the arm into the arm holder from an extended position to a retracted position.

4. The illustrative sample receiving assembly of embodiment 3, further comprising a curved groove in the support surface, the curved groove sized to receive the guide pin and positioned to guide the guide pin to the plurality of linear grooves upon rotation of the arm and arm holder.

5. The illustrative sample receiving assembly of embodiment 4, the plurality of linear grooves within the support member comprising:
   a first linear groove extending vertically from the curved groove toward the bore;
   a second linear groove extending from the curved groove and away from the bore at a first angle from the first linear groove;
   a third linear groove extending from the curved groove and away from the bore at a second angle from the first linear groove; and
   a fourth linear groove extending from the curved groove and away from the bore at a third angle from the first linear groove.

6. The illustrative sample receiving assembly of embodiment 5, wherein the second linear groove has a length to allow retraction of the arm and extension of the sample probe relative to the arm and compatible with sampling from a closed collection tube.

7. The illustrative sample receiving assembly of embodiment 5, wherein the third linear groove has a length to allow retraction of the arm and extension of the sample probe relative to the arm and compatible with sampling from a syringe.

8. The illustrative sample receiving assembly of embodiment 5, wherein the fourth linear groove has a length to allow retraction of the arm and extension of the sample probe relative to the arm and compatible with sampling from a capillary.

9. The illustrative sample receiving assembly of embodiment 3, further comprising a biasing element biasing the arm from the retracted position to the extended position.

10. The illustrative sample receiving assembly of embodiment 3, further comprising at least one of a system seal, a capillary connector, and a probe wipe, positioned adjacent the distal end of the arm.

11. The illustrative sample receiving assembly of embodiment 3, wherein the arm holder further comprises a geared portion, and the illustrative sample receiving assembly further comprises a drive gear engageable with the geared portion of the arm holder such that rotation of the drive gear rotates the arm holder.

12. The illustrative sample receiving assembly of embodiment 3, wherein the arm holder further comprises a pivot stud axially aligned with and opposing the hollow pivot pin, and wherein The illustrative sample receiving assembly further comprises a lift cam rotatable about the pivot stud, the lift cam further contacting the arm so as to raise or lower the arm with rotation of the lift cam.

13. The illustrative sample receiving assembly of embodiment 12, wherein the lift cam comprises a slot therethrough, the slot having a first end, and wherein the arm holder further comprises a stop pin positioned to extend through the slot in the lift cam, the stop pin and slot aligned such that rotation of the lift cam in a first direction causes the stop pin to abut the first end of the slot and wherein further rotation of the lift cam in the first direction causes rotation of the arm holder.

14. The illustrative sample receiving assembly of embodiment 13, further comprising a drive gear engageable with the lift cam, and wherein the arm holder further comprises a geared portion positioned to engage the drive gear and rotate the arm holder once the stop pin abuts the first end of the slot initiating rotation of the arm holder.

15. The illustrative sample receiving assembly of embodiment 14, further comprising a system seal adjacent the distal end of the arm, the system seal engageable with a reagent cartridge nipple when the arm is in a standby position.

16. The illustrative sample receiving assembly of embodiment 15, wherein rotation of the lift cam raises the arm and the system seal off of the nipple.

17. The illustrative sample receiving assembly of embodiment 14, further comprising:
an input device;
a positioning sensor located to determine a position of the guide pin;
a motor driving the drive gear;
a processor configured to:
receive from the input device a first signal indicative of a selected sample container type, receive second signals from the positioning sensor indicative of the position of the guide pin, activate the motor for a time sufficient for the guide pin to lift and rotate to a position consistent with the selected sample container type.

18. The illustrative sample receiving assembly of embodiment 3, wherein the arm holder, arm, and sample probe are replaceable.

19. An illustrative sample receiver comprising:
an arm holder comprising a hollow pivot pin, a pivot stud axially aligned with and opposing the hollow pivot pin, and a geared portion;
an arm partially disposed within the arm holder, the arm comprising a guide pin and a distal end;
a lift cam rotatable about the pivot stud, the lift cam further contacting the arm so as to raise or lower the arm with rotation of the lift cam; and
a biasing element biasing the arm to extend from the arm holder;
wherein the lift cam comprises a slot therethrough, the slot having a first end, and wherein the arm holder further comprises a stop pin positioned to extend through the slot in the lift cam, the stop pin and slot aligned such that rotation of the lift cam in a first direction causes the stop pin to abut the first end of the slot and wherein further rotation of the lift cam in the first direction causes rotation of the arm holder.

20. The illustrative sample receiver of embodiment 19, further comprising a sample probe partially disposed within the arm, the sample probe having a first portion extendable through the distal end of the arm and a second portion extending axially through the hollow pivot pin of the arm holder.

21. An illustrative fluid testing device, comprising:
a chamber containing analytical components and having a wall with a bore therethrough;
an arm holder comprising a hollow pivot pin pivotally positioned within the bore, a pivot stud axially aligned with and opposing the hollow pivot pin, and a geared portion;
an arm partially disposed within the arm holder, the arm comprising a guide pin and a distal end;
a sample probe partially disposed within the arm, the sample probe having a first portion extendable through the distal end of the arm and a second portion extending axially through the hollow pivot pin into the chamber to connect to at least one of the analytical components;
at least three linear grooves in the wall, the linear grooves sized to receive the guide pin, the linear grooves positioned to guide retraction of the arm into the arm holder from an extended position to a retracted position, and wherein each linear groove has a different length to allow extension of the sample probe compatible with sampling from at least three different sample container types;
a drive gear engageable with the geared portion of the arm holder such that, when engaged, rotation of the drive gear rotates the arm holder;
a lift cam rotatable about the pivot stud, the lift cam further contacting the arm so as to raise or lower the arm with rotation of the lift cam, wherein the lift cam comprises a slot therethrough, the slot having a first end, and wherein the arm holder further comprises a stop pin positioned to extend through the slot in the lift cam, the stop pin and slot aligned such that rotation of the lift cam in a first direction causes the stop pin to abut the first end of the slot and wherein further rotation of the lift cam in the first direction engages the drive gear with the geared portion of the arm holder;

a positioning sensor located to determine a position of the guide pin;

a motor driving the drive gear; and a processor configured to receive from the input device a first signal indicative of a selected sample container type, receive second signals from the positioning sensor indicative of the position of the guide pin, and activate the motor for a time sufficient for the guide pin to lift and rotate to a position consistent with the selected sample container type.

22. The illustrative fluid testing device of embodiment 21, further comprising at least one of a system seal, a capillary connector, and a probe wipe, positioned adjacent the distal end of the arm.

23. The illustrative sample receiving assembly of embodiment 4, further comprising a positioning disc engageable with the arm holder and having a central bore axially aligned with the support member bore to receive the hollow pivot pin, the illustrative sample receiving assembly further comprising a drive gear engageable with the positioning disc such that rotation of the drive gear rotates the arm holder.

24. The illustrative sample receiving assembly of embodiment 23, wherein the positioning disc further has a lift slot and wherein the arm further comprises a lifting pin positioned to extend into the lift slot, the lifting pin and lift slot aligned such that rotation of the positioning disc in a first direction raises the lifting pin to an outward surface of the lift slot causing the arm to raise.

25. The illustrative sample receiving assembly of embodiment 24, wherein the positioning disc further has a rotation slot and wherein the arm holder further comprises a stop pin positioned to extend into the rotation slot, the stop pin and rotation slot aligned such that rotation of the positioning disc in the first direction causes the stop pin to abut a first end of the rotation slot and wherein further rotation of the positioning disc in the first direction causes rotation of the arm holder.

26. The illustrative sample receiving assembly of embodiment 25, wherein the support member further comprises a drive housing for the drive gear, the drive gear comprising a main drive gear engageable with a motor, and a transition drive gear engageable with the main drive gear and the positioning disc.

27. The illustrative sample receiving assembly of embodiment 25, further comprising a system seal adjacent the distal end of the arm, the system seal engageable with a reagent cartridge nipple when the arm is in a standby position.

28. The illustrative sample receiving assembly of embodiment 27, wherein rotation of the positioning disc raises the arm and the system seal off of the nipple.

29. The illustrative sample receiving assembly of embodiment 25, the plurality of linear grooves within the support member comprising:

a first linear groove extending vertically from the curved groove toward the bore;

a second linear groove extending from the curved groove and away from the bore at a first angle from the first linear groove;

a third linear groove extending from the curved groove and away from the bore at a second angle from the first linear groove; and a fourth linear groove extending from the curved groove and away from the bore at a third angle from the first linear groove.

30. The illustrative sample receiving assembly of embodiment 29, wherein the second linear groove has a length to allow retraction of the arm and extension of the sample probe relative to the arm and compatible with sampling from a closed collection tube.

31. The illustrative sample receiving assembly of embodiment 29, wherein the third linear groove has a length to allow retraction of the arm and extension of the sample probe relative to the arm and compatible with sampling from a syringe.

32. The illustrative sample receiving assembly of embodiment 29, wherein the fourth linear groove has a length to allow retraction of the arm and extension of the sample probe relative to the arm and compatible with sampling from a capillary.

33. The illustrative sample receiving assembly of embodiment 29, further comprising a biasing element biasing the arm from the retracted position to the extended position.

34. The illustrative sample receiving assembly of embodiment 25, further comprising:

an input device;

a positioning sensor located to determine a position of the guide pin;

a motor driving the drive gear;

a processor configured to:

receive from the input device a first signal indicative of a selected sample container type, receive second signals from the positioning sensor indicative of the position of the guide pin, activate the motor for a time sufficient for the guide pin to lift and rotate to a position consistent with the selected sample container type.

35. The illustrative sample receiving assembly of embodiment 25, further comprising a sample port positioned adjacent the distal end of the arm, wherein the sample port includes a capillary connector, a probe wipe and a system seal.

36. The illustrative sample receiving assembly of embodiment 35, wherein the sample port is replaceable.

37. The illustrative sample receiving assembly of embodiment 25, wherein the arm holder, arm, and sample probe are replaceable.

38. An illustrative sample receiver comprising:

an arm holder comprising a stop pin and a hollow pivot pin;

an arm partially disposed within the arm holder, the arm comprising a lifting pin, a guide pin, and a distal end;

a positioning disc rotatable about the hollow pivot pin, the positioning disc comprising a lift slot and a rotation slot; and a biasing element biasing the arm to extend from the arm holder;

wherein the lifting pin extends into the lift slot, the lifting pin and lift slot aligned such that rotation of the positioning disc in a first direction raises the lifting pin to an outward surface of the lift slot causing the arm to raise, and wherein the stop pin extends into the rotation slot, the stop pin and rotation slot aligned such that rotation of the positioning disc in the first direction causes the stop pin to abut a first end of the rotation slot and wherein further rotation of the positioning disc in the first direction causes rotation of the arm holder.

39. The illustrative sample receiver of embodiment 38, further comprising a sample probe partially disposed within the arm, the sample probe having a first portion extendable through the distal end of the arm and a second portion extending axially through the hollow pivot pin of the arm holder.

40. An illustrative fluid testing device, comprising:
a chamber containing analytical components and having a wall with a bore therethrough;
an arm holder comprising a hollow pivot pin pivotally positioned within the bore;
an arm partially disposed within the arm holder, the arm comprising a lifting pin, a guide pin, and a distal end;
a sample probe partially disposed within the arm, the sample probe having a first portion extendable through the distal end of the arm and a second portion extending axially through the hollow pivot pin into the chamber to connect to at least one of the analytical components;
at least three linear grooves in the wall, the linear grooves sized to receive the guide pin, the linear grooves positioned to guide retraction of the arm into the arm holder from an extended position to a retracted position, and wherein each linear groove has a different length to allow extension of the sample probe compatible with sampling from at least three different sample container types;
a positioning disc rotatable about the hollow pivot pin, the positioning disc comprising a lift slot and a rotation slot;
a drive gear engageable with gear teeth on the positioning disc such that, when engaged, rotation of the drive gear rotates the positioning disc;
wherein the lifting pin is positioned to extend into the lift slot, the lifting pin and lift slot aligned such that rotation of the positioning disc in a first direction raises the lifting pin to an outward surface of the lift slot causing the arm to raise, and
wherein the arm holder further comprises a stop pin positioned to extend into the rotation slot, the stop pin and rotation slot aligned such that rotation of the positioning disc in the first direction causes the stop pin to abut a first end of the rotation slot and wherein further rotations of the positioning disc in the first direction causes rotation of the arm holder; and
a positioning sensor located to determine a position of the guide pin;
a motor driving the drive gear; and
a processor configured to receive from the input device a first signal indicative of a selected sample container type, receive second signals from the positioning sensor indicative of the position of the guide pin, and activate the motor for a time sufficient for the guide pin to lift and rotate to a position consistent with the selected sample container type.

41. The illustrative fluid testing device of embodiment 40, further comprising at least one of a system seal, a capillary connector, and a probe wipe, positioned adjacent the distal end of the arm.

What is claimed is:
1. A sample receiving assembly, comprising:
a support member having a bore extending therethrough;
an arm holder pivotally connected to the support member about an axis of rotation axially aligned with the bore;
an arm disposed within the arm holder and axially slidable relative thereto, the arm comprising a distal end;
a sample probe partially disposed within the arm, the sample probe having a first portion extendable through the distal end of the arm and a second portion extending through the bore of the support member;
wherein the arm holder, the arm, and the sample probe are rotatable to selected positions and the arm is axially movable relative to the arm holder and the sample probe in a way that the arm is selectively positionable to alter the position of the first portion of the sample probe relative to the arm so that the sample probe can receive a sample from different types of sample transport containers; and
wherein the arm holder includes a hollow pivot pin received by the bore of the support member, and wherein the second portion of the sample probe extends axially through the hollow pivot pin.

2. The sample receiving assembly of claim 1, further comprising:
a guide pin disposed on the arm; and
a plurality of linear grooves formed along the support member, the plurality of linear grooves sized to receive the guide pin and positioned to guide retraction of the arm into the arm holder from an extended position to a retracted position.

3. The sample receiving assembly of claim 2, further comprising a biasing element biasing the arm from the retracted position to the extended position.

4. The sample receiving assembly of claim 2, further comprising a curved groove in the support member, the curved groove sized to receive the guide pin and positioned to guide the guide pin to the plurality of linear grooves upon rotation of the arm and arm holder.

5. A sample receiving assembly, comprising:
a support member having a bore extending therethrough;
an arm holder pivotally connected to the support member, the arm holder including a hollow pivot pin received by the support member bore;
an arm disposed within the arm holder and axially slidable relative thereto, the arm comprising a distal end;
a sample probe partially disposed within the arm, the sample probe having a first portion extendable through the distal end of the arm and a second portion extending axially through the hollow pivot pin;
a guide pin disposed on the arm;
a plurality of linear grooves formed along the support member, the plurality of linear grooves sized to receive the guide pin and positioned to guide retraction of the arm into the arm holder from an extended position to a retracted position; and
a curved groove in the support surface, the curved groove sized to receive the guide pin and positioned to guide the guide pin to the plurality of linear grooves upon rotation of the arm and arm holder;
wherein the plurality of linear grooves within the support member comprising:
a first linear groove extending vertically from the curved groove toward the bore;
a second linear groove extending from the curved groove and away from the bore at a first angle from the first linear groove;
a third linear groove extending from the curved groove and away from the bore at a second angle from the first linear groove; and
a fourth linear groove extending from the curved groove and away from the bore at a third angle from the first linear groove, and
holder,
wherein the arm holder, the arm, and the sample probe are rotatable to selected positions and the arm is axially movable relative to the arm holder and the sample probe in a way that the arm is selectively positionable to alter the position of the first portion of the sample probe relative to the arm so that the sample probe can receive a sample from different types of sample transport containers.

6. The sample receiving assembly of claim 5, wherein the second linear groove has a length to allow retraction of the arm and extension of the sample probe relative to the arm and compatible with sampling from a closed collection tube.

7. The sample receiving assembly of claim 5, wherein the third linear groove has a length to allow retraction of the arm and extension of the sample probe relative to the arm and compatible with sampling from a syringe.

8. The sample receiving assembly of claim 5, wherein the fourth linear groove has a length to allow retraction of the arm and extension of the sample probe relative to the arm and compatible with sampling from a capillary.

9. A sample receiving assembly, comprising:
a support member having a bore extending therethrough;
an arm holder pivotally connected to the support member, the arm holder including a hollow pivot pin received by the support member bore;
an arm disposed within the arm holder and axially slidable relative thereto, the arm comprising a distal end;
a sample probe partially disposed within the arm, the sample probe having a first portion extendable through the distal end of the arm and a second portion extending through axially through the hollow pivot pin;
a positioning disc engageable with the arm holder and having a central bore axially aligned with the bore of the support member to receive the hollow pivot pin;
a drive gear engageable with the positioning disc such that rotation of the drive gear rotates the arm holder;
a guide pin disposed on the arm;
a plurality of linear grooves formed along the support member, the plurality of linear grooves sized to receive the guide pin and positioned to guide retraction of the arm into the arm holder from an extended position to a retracted position; and
a curved groove in the support member, the curved groove sized to receive the guide pin and positioned to guide the guide pin to the plurality of linear grooves upon rotation of the arm and arm holder,
wherein the arm holder, the arm, and the sample probe are rotatable to selected positions and the arm is axially movable relative to the arm holder and the sample probe in a way that the arm is selectively positionable to alter the position of the first portion of the sample probe relative to the arm so that the sample probe can receive a sample from different types of sample transport containers.

10. The sample receiving assembly of claim 9, wherein the positioning disc further has a lift slot and wherein the arm further comprises a lifting pin positioned to extend into the lift slot, the lifting pin and lift slot aligned such that rotation of the positioning disc in a first direction raises the lifting pin to an outward surface of the lift slot causing the arm to raise.

11. The sample receiving assembly of claim 10, wherein the positioning disc further has a rotation slot and wherein the arm holder further comprises a stop pin positioned to extend into the rotation slot, the stop pin and rotation slot aligned such that rotation of the positioning disc in the first direction causes the stop pin to abut a first end of the rotation slot and wherein further rotation of the positioning disc in the first direction causes rotation of the arm holder.

12. The sample receiving assembly of claim 11, wherein the support member further comprises a drive housing for the drive gear, the drive gear comprising a main drive gear engageable with a motor, and a transition drive gear engageable with the main drive gear and the positioning disc.

13. The sample receiving assembly of claim 11, further comprising a system seal adjacent the distal end of the arm, the system seal engageable with a reagent cartridge nipple when the arm is in a standby position.

14. The sample receiving assembly of claim 13, wherein rotation of the positioning disc raises the arm and the system seal off of the nipple.

15. The sample receiving assembly of claim 11, further comprising a sample port positioned adjacent the distal end of the arm, wherein the sample port includes a capillary connector, a probe wipe and a system seal.

16. The sample receiving assembly of claim 15, wherein the sample port is replaceable.

17. The sample receiving assembly of claim 11, wherein the arm holder, the arm, and the sample probe are replaceable.

* * * * *